United States Patent
Tabet et al.

(10) Patent No.: US 9,872,316 B2
(45) Date of Patent: Jan. 16, 2018

(54) ENHANCED PRACH SCHEME FOR POWER SAVINGS, RANGE IMPROVEMENT AND IMPROVED DETECTION

(71) Applicant: Apple Inc., Cupertino, CA (US)

(72) Inventors: Tarik Tabet, Los Gatos, CA (US); Youngjae Kim, San Jose, CA (US); Syed Aon Mujtaba, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 182 days.

(21) Appl. No.: 14/729,360

(22) Filed: Jun. 3, 2015

(65) Prior Publication Data

US 2015/0365977 A1    Dec. 17, 2015

Related U.S. Application Data

(60) Provisional application No. 62/012,234, filed on Jun. 13, 2014, provisional application No. 62/020,842, (Continued)

(51) Int. Cl.
*H04W 74/08* (2009.01)
*H04J 13/00* (2011.01)
(Continued)

(52) U.S. Cl.
CPC ..... *H04W 74/0833* (2013.01); *H04J 13/0062* (2013.01); *H04L 1/189* (2013.01);
(Continued)

(58) Field of Classification Search
CPC ......... H04J 13/0062; H04J 4/00; H04L 1/189; H04L 5/26; H04W 52/34; H04W 72/0406;
(Continued)

(56) References Cited

U.S. PATENT DOCUMENTS 8,520,753 B2   8/2013  Zheng
9,253,692 B1*  2/2016  Shah ................. H04W 36/0072
(Continued)

FOREIGN PATENT DOCUMENTS

EP        2015599 A1       1/2009
WO        2014067107       5/2014
WO   WO 2015/005656 A1    1/2015

OTHER PUBLICATIONS

Office Action for ROC (Taiwan) Patent Application No. 104118420, Jul. 27, 2016, pp. 1-20.
(Continued)

*Primary Examiner* — Robert Lopata
(74) *Attorney, Agent, or Firm* — Meyertons Hood Kivlin Kowert & Goetzel, P.C.; Jeffrey C. Hood; Mark K. Brightwell

(57) ABSTRACT

Enhanced random access procedures for link-budget-limited user equipment (UE) devices are disclosed. A user equipment device may transmit a first message containing a Physical Random Access Channel (PRACH). The PRACH contains instances of a Zadoff-Chu sequence, and may be transmitted repeatedly as part of a single random attempt, to facilitate correlation data combining at the base station. The available Zadoff-Chu sequences may be partitioned among a plurality of sets, each set being associated with a respective Doppler shift range (or frequency hop pattern or time repetition pattern). A UE device may signal Doppler shift (or other information) to the base station by selection of one of the sets. The first PRACH transmission and the following PRACH transmission may occur in consecutive subframes. A UE device may select from a special set of Zadoff-Chu sequences (different from a conventional set of sequences), to signal its status as a link-budget-limited device.

27 Claims, 22 Drawing Sheets

Related U.S. Application Data filed on Jul. 3, 2014, provisional application No. 62/131,167, filed on Mar. 10, 2015, provisional application No. 62/133,232, filed on Mar. 13, 2015, provisional application No. 62/135,138, filed on Mar. 18, 2015.

(51) Int. Cl.
*H04L 1/18* (2006.01)
*H04W 52/34* (2009.01)
*H04W 72/04* (2009.01)
*H04W 74/00* (2009.01)

(52) U.S. Cl.
CPC ....... *H04W 52/34* (2013.01); *H04W 72/0406* (2013.01); *H04W 74/004* (2013.01); *Y02B 60/50* (2013.01)

(58) Field of Classification Search
CPC .............. H04W 74/004; H04W 74/0833; Y02B 60/50; H04B 7/2615
USPC .......................................... 370/330
See application file for complete search history.

(56) References Cited

U.S. PATENT DOCUMENTS

| | | |
|---|---|---|
| 2008/0194259 A1 | 8/2008 | Vujcic et al. |
| 2009/0305693 A1 | 12/2009 | Shimomura et al. |
| 2010/0278137 A1 | 11/2010 | Kwon et al. |
| 2010/0311428 A1 | 12/2010 | Zhang et al. |
| 2011/0014922 A1 | 1/2011 | Jen |
| 2011/0310857 A1 | 12/2011 | Vujcic |
| 2014/0044108 A1* | 2/2014 | Earnshaw ............ G01S 5/0063 370/336 |
| 2014/0160926 A1 | 6/2014 | Gage et al. |
| 2015/0326995 A1* | 11/2015 | Li ......................... H04W 74/08 370/329 |
| 2016/0174261 A1* | 6/2016 | Yang .................... H04L 5/0053 370/329 |

OTHER PUBLICATIONS

International Search Report & Written Opinion, Application No. PCT/US2015/033984, mailed Aug. 24, 2015, 16 pages.
Ericsson, "E-UTRA Scalability of Random Access Preamble", TSG-RAN WG1 #45 Discussion and Decision, May 2, 2006, 7 pages, Shanghai, China.

* cited by examiner

900 transmit a first message including at least three instances of a Zadoff-Chu sequence, wherein the first message is transmitted on a physical random access channel (PRACH) within a time-frequency resource space  910

FIG. 9

1000 transmit first configuration information for one or more range-constrained user equipment (UE) devices, wherein each of the range-constrained UE devices is configured to transmit a random access preamble and perform one or more retransmissions of the random access preamble, wherein the random access preamble includes one or more instances of a Zadoff-Chu sequence, wherein the first configuration information indicates a pattern of times for said transmission and said one or more retransmissions of the random access preamble  1010 receive said transmission of the random access preamble from a first of the one or more UE devices to obtain a first data record  1015 receive said one or more retransmissions of the random access preamble from the first UE device to obtain one or more additional data records  1020 decode the random access preamble based on the first data record and the one or more additional data records  1025

```
select a set from a plurality of sets of Zadoff-Chu sequences based on a
measurement of Doppler shift magnitude of UE relative to a base station,
wherein identity of the selected set among the plurality of sets is usable by a
base station to determine a correlation accumulation method   1110
```

```
perform two or more transmissions of a first message, wherein the first
message includes one or more instances of a particular Zadoff-Chu sequence
chosen from the selected set   1115
```

```
select a set from a plurality of sets based on a measurement of Doppler shift
magnitude of UE relative to a base station, wherein each of the sets includes a
plurality of Zadoff-Chu sequences, wherein different ones of the sets have been
assigned to different ranges of Doppler shift magnitude   1210
```

```
perform two or more transmissions of a first message, wherein the first
message includes one or more instances of a particular Zadoff-Chu sequence
chosen from the selected set   1215
```

*FIG. 12*

1400 receive symbol data in response to two or more transmissions of a first message from the UE device, wherein the first message includes one or more instances of a particular Zadoff-Chu sequence, wherein the particular Zadoff-Chu sequence has been chosen by the UE device from a selected one of a plurality of sets of Zadoff-Chu sequences, wherein each of the sets corresponds to a different range of magnitude of Doppler shift of the UE device relative to the base station    1410 perform correlation processing on the symbol data to determine information identifying the particular Zadoff-Chu sequence and information identifying the selected set among the plurality of sets    1415 select a correlation accumulation method from a complex-valued accumulation method and an energy accumulation method based on the information identifying the selected set    1420 accumulate two or more correlation sequences according to the selected correlation accumulation method, wherein each of the two or more correlation sequences is generated by correlation of a respective portion of the symbol data with the particular Zadoff-Chu sequence, wherein each of the portions of the symbol data corresponds to a respective instance of the particular Zadoff-Chu sequence in one of the two or more transmissions    1425

FIG. 14

1600 transmit a plurality of instances of a Physical Random Access Channel (PRACH) over a plurality of consecutive subframes to a base station, with each of the consecutive subframes including a corresponding one of the PRACH instanc   1610

FIG. 16

1700 receive symbol data in response to a transmission of a plurality of instances of a PRACH by the UE device, wherein the plurality of PRACH instances are transmitted over a plurality of consecutive subframes, wherein each of the plurality of consecutive subframes contains a corresponding one of the PRACH instances   1710

perform correlation processing on the symbol data to determine which Zadoff-Chu (ZC) sequence from a set of available ZC sequences is included in the plurality of PRACH instances, wherein said correlation processing accumulates correlation data over the plurality of consecutive subframes   1715

FIG. 17

1800 transmit a first set of one or more instances of a Physical Random Access Channel (PRACH) respectively over a first set of one or more consecutive subframes, wherein said transmitting the first set of one or more PRACH instances is performed according to a conventional format for transmission of PRACH   1810

transmit a second set of one or more instances of the PRACH respectively over a second set of one or more consecutive subframes starting immediately after a last subframe of the first set of one or more subframes, wherein each of the one or more PRACH instances of the first set and each of the one or more PRACH instances of the second set use the same Zadoff-Chu sequence   1815

FIG. 18

1900 transmit a first set of one or more consecutive subframes including a first Physical Random Access Channel (PRACH), wherein the first PRACH is transmitted according to a conventional format for PRACH transmission 1910

transmit a second set of one or more consecutive subframes containing one or more repetitions of the first PRACH, wherein the second set of one or more subframes starts immediately after a last subframe of the first set of one or more subframes, wherein each of the one or more PRACH repetitions uses the same Zadoff-Chu sequence as the first PRACH   1915

FIG. 19

2000 receive a first symbol data set in response to a first transmission by the UE device, wherein the first transmission includes a first set of one or more instances of a Physical Random Access Channel (PRACH) respectively over a first set of one or more consecutive subframes, wherein said first transmission is performed according to a conventional format for transmission of PRACH 2010 receive a second symbol data set in response to a subsequent transmission by the UE device, wherein the subsequent transmission includes a second set of one or more consecutive subframes starting immediately after a last subframe of the first set of one or more subframes  2015 perform correlation processing on a union of the first symbol data set and the second symbol data set to determine if the second set of one or more consecutive subframes contains one or more PRACH instances in addition to the first set of one or more PRACH instances, wherein the one or more additional PRACH instances, if present, are assumed to use to the same ZC sequence as the one or more PRACH instances of the first set  2020 in response determining that the second set of one or more consecutive subframes contains one or more PRACH instances in addition to the first set of one or more PRACH instances, store in memory an indication that the UE device is link budget limited  2025

FIG. 20

2100 receive a first symbol data set in response to a first transmission by the UE device, wherein the first transmission is a transmission of a first set of one or more consecutive subframes including a first Physical Random Access Channel (PRACH), wherein said first PRACH is transmitted according to a conventional format for PRACH transmission   2110 receive a second symbol data set in response to a subsequent transmission by the UE device, wherein the subsequent transmission is a transmission of a second set of one or more consecutive subframes, wherein the second set of one or more consecutive subframes starts immediately after a last subframe of the first set of one or more subframes   2115 perform correlation processing on a union of the first symbol data set and the second symbol data set to determine if the second set of one or more consecutive subframes contains one or more repetitions of the first PRACH, wherein the one or more repetitions of the first PRACH, if present, are assumed to use to the same Zadoff-Chu sequence as the first PRACH   2120 in response determining that the second set of one or more consecutive subframes contains one or more repetitions of the first PRACH, store in memory an indication that the UE device is link budget limited   2125

*FIG. 21*

| Logical root sequence number | Physical root sequence number u (in increasing order of the corresponding logical sequence number) |
|---|---|
| 0–23 | 129, 710, 140, 699, 120, 719, 210, 629, 168, 671, 84, 755, 105, 734, 93, 746, 70, 769, 60, 779, 2, 837, 1, 838 |
| 24–29 | 56, 783, 112, 727, 148, 691 |
| 30–35 | 80, 759, 42, 797, 40, 799 |
| 36–41 | 35, 804, 73, 766, 146, 693 |
| 42–51 | 31, 808, 28, 811, 30, 809, 27, 812, 29, 810 |
| 52–63 | 24, 815, 48, 791, 68, 771, 74, 765, 178, 661, 136, 703 |
| 64–75 | 86, 753, 78, 761, 43, 796, 39, 800, 20, 819, 21, 818 |
| 76–89 | 95, 744, 202, 637, 190, 649, 181, 658, 137, 702, 125, 714, 151, 688 |
| 90–115 | 217, 622, 128, 711, 142, 697, 122, 717, 203, 636, 118, 721, 110, 729, 89, 750, 103, 736, 61, 778, 55, 784, 15, 824, 14, 825 |
| 116–135 | 12, 827, 23, 816, 34, 805, 37, 802, 46, 793, 207, 632, 179, 660, 145, 694, 130, 709, 223, 616 |
| 136–167 | 228, 611, 227, 612, 132, 707, 133, 706, 143, 696, 135, 704, 161, 678, 201, 638, 173, 666, 106, 733, 83, 756, 91, 748, 66, 773, 53, 786, 10, 829, 9, 830 |
| 168–203 | 7, 832, 8, 831, 16, 823, 47, 792, 64, 775, 57, 782, 104, 735, 101, 738, 108, 731, 208, 631, 184, 655, 197, 642, 191, 648, 121, 718, 141, 698, 149, 690, 216, 623, 218, 621 |
| 204–263 | 152, 687, 144, 695, 134, 705, 138, 701, 199, 640, 162, 677, 176, 663, 119, 720, 158, 681, 164, 675, 174, 665, 171, 668, 170, 669, 87, 752, 169, 670, 88, 751, 107, 732, 81, 758, 82, 757, 100, 739, 98, 741, 71, 768, 59, 780, 65, 774, 50, 789, 49, 790, 26, 813, 17, 822, 13, 826, 6, 833 |
| 264–327 | 5, 834, 33, 806, 51, 788, 75, 764, 99, 740, 96, 743, 97, 742, 166, 673, 172, 667, 175, 664, 187, 652, 163, 676, 185, 654, 200, 639, 114, 725, 189, 650, 115, 724, 194, 645, 195, 644, 192, 647, |

FIG. 22

| zeroCorrelationZoneConfig | $N_{CS}$ value | |
|---|---|---|
| | Unrestricted set | Restricted set |
| 0 | 0 | 15 |
| 1 | 13 | 18 |
| 2 | 15 | 22 |
| 3 | 18 | 26 |
| 4 | 22 | 32 |
| 5 | 26 | 38 |
| 6 | 32 | 46 |
| 7 | 38 | 55 |
| 8 | 46 | 68 |
| 9 | 59 | 82 |
| 10 | 76 | 100 |
| 11 | 93 | 128 |
| 12 | 119 | 158 |
| 13 | 167 | 202 |
| 14 | 279 | 237 |
| 15 | 419 | - |

FIG. 23

| PRACH Configuration Index | Preamble Format | System frame number | Subframe number | PRACH Configuration Index | Preamble Format | System frame number | Subframe number |
|---|---|---|---|---|---|---|---|
| 0 | 0 | Even | 1 | 32 | 2 | Even | 1 |
| 1 | 0 | Even | 4 | 33 | 2 | Even | 4 |
| 2 | 0 | Even | 7 | 34 | 2 | Even | 7 |
| 3 | 0 | Any | 1 | 35 | 2 | Any | 1 |
| 4 | 0 | Any | 4 | 36 | 2 | Any | 4 |
| 5 | 0 | Any | 7 | 37 | 2 | Any | 7 |
| 6 | 0 | Any | 1,6 | 38 | 2 | Any | 1,6 |
| 7 | 0 | Any | 2,7 | 39 | 2 | Any | 2,7 |
| 8 | 0 | Any | 3,8 | 40 | 2 | Any | 3,8 |
| 9 | 0 | Any | 1,4,7 | 41 | 2 | Any | 1,4,7 |
| 10 | 0 | Any | 2,5,8 | 42 | 2 | Any | 2,5,8 |
| 11 | 0 | Any | 3,6,9 | 43 | 2 | Any | 3,6,9 |
| 12 | 0 | Any | 0,2,4,6,8 | 44 | 2 | Any | 0,2,4,6,8 |
| 13 | 0 | Any | 1,3,5,7,9 | 45 | 2 | Any | 1,3,5,7,9 |
| 14 | 0 | Any | 0,1,2,3,4,5,6,7,8,9 | 46 | N/A | N/A | N/A |
| 15 | 0 | Even | 9 | 47 | 2 | Even | 9 |
| 16 | 1 | Even | 1 | 48 | 3 | Even | 1 |

```
receive system information including a configuration index for Physical Random
Access Channel (PRACH), a cyclic shift value (Ncs) and a logical root number
2510
```

```
if the first UE device is link budget limited, perform operations including:   2520 compute a first physical root number based on the logical root number,
    wherein the first physical root number is different from a conventional
    physical root number corresponding to the logical root number  2525 generate a first set of Zadoff-Chu sequences based on the cyclic shift
    value and one or more physical root numbers including the first physical
    root number  2530 randomly select one of the Zadoff-Chu sequences of the first set  2535 transmit a first PRACH subframe that includes repetitions of the selected
    Zadoff-Chu sequence, wherein the first PRACH subframe is transmitted
    during a first radio frame  2540
```

*FIG. 25*

ENHANCED PRACH SCHEME FOR POWER SAVINGS, RANGE IMPROVEMENT AND IMPROVED DETECTION

PRIORITY CLAIM INFORMATION

This application claims the benefit of priority to each of the following U.S. Provisional applications:

U.S. Provisional Application No. 62/012,234 titled "Enhanced PRACH Scheme for Power Saving and Range Improvement", by Tarik Tabet, Youngjae Kim and Syed Aon Mujtaba, filed Jun. 13, 2014;

U.S. Provisional Application No. 62/020,842 titled "Enhanced PRACH Scheme for Power Savings, Range Improvement and Improved Detection", by Tarik Tabet, Youngjae Kim and Syed Aon Mujtaba, filed Jul. 3, 2014;

U.S. Provisional Application No. 62/131,167 titled "Enhanced PRACH Scheme for Power Savings, Range Improvement and Improved Detection", by Tarik Tabet, Youngjae Kim and Syed Aon Mujtaba, filed Mar. 10, 2015;

U.S. Provisional Application No. 62/133,232 titled "Enhanced PRACH Scheme for Power Savings, Range Improvement and Improved Detection", by Tarik Tabet, Youngjae Kim and Syed Aon Mujtaba, filed Mar. 13, 2015; and U.S. Provisional Application No. 62/135,138 titled "Enhanced PRACH Scheme for Power Savings, Range Improvement and Improved Detection", by Tarik Tabet, Youngjae Kim and Syed Aon Mujtaba, filed Mar. 18, 2015.

All of the above identified applications are hereby incorporated by reference in their entireties as though fully and completely set forth herein.

FIELD

The present application relates to wireless communication devices, and more particularly to mechanisms for enhancing random access procedure for user equipment devices that are link budget limited (e.g., range constrained).

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the Internet, email, text messaging, and navigation using the global positioning system (GPS), and are capable of operating sophisticated applications that utilize these functionalities.

In LTE, the random access procedure (referred to herein as "RACH") is an important procedure for synchronizing the UE device with the network (NW). RACH could be used for: initial access by the UE device; handover of the UE device from one cell to another; RRC re-establishment; UL/DL data arrival; positioning in RRC connected. RACH is a very important procedure to allow the UE to access the NW, to synchronize, and to obtain orthogonal resources. Thus, it is important to ensure that its detection by the NW is successful. Different methods are used currently in the 3GPP Specifications as follows: (a) use of different preambles—orthogonal or with good cross-correlation properties; (b) multiple RACH attempts (depending on the NW configuration); (c) power ramp up on each successive RACH attempt.

If the device is link budget limited, a mechanism to alleviate the effect of bad reception of the PRACH (Physical Random Access Channel) is needed. A device may be link budget limited, e.g., if the device is equipped with a poorly performing antenna system and/or if the device is located in area of poor coverage (e.g., far from a base station or in the basement of a building).

SUMMARY

Enhanced random access procedures for link-budget-limited user equipment (UE) devices are disclosed.

In order to initiate a random access procedure (RACH), a user equipment device that is link budget limited may transmit a first message containing a Physical Random Access Channel (PRACH) preamble. In some embodiments, the PRACH preamble may have larger subcarrier spacing and/or larger temporal width than defined for conventional PRACH formats. In some embodiments, a larger number of instances of a selected Zadoff-Chu sequence may be embedded within the PRACH preamble than in conventional PRACH formats. These features may enable the base station to increase its probability of successful decode for UE devices that are link budget limited.

In some embodiments, as part of a single random access attempt (RACH attempt), the UE device that is link budget limited may transmit the PRACH preamble a plurality of times, with transmission timing determined by timing configuration information supplied by the base station. (The timing configuration information may determine when each of the transmissions of the PRACH preamble is to occur.) Each retransmission of the PRACH preamble may be identical in structure and content to the initial transmission. The base station may combine two or more received instances of the PRACH preamble, to increase probability of successful decode.

The base station may transmit a second message, e.g., a random access response (RAR), to the link-budget-limited UE device with repetition in time and/or with lower coding rate than conventional RAR messages. In response to the second message, the link-budget-limited UE device may transmit a third message, likewise with repetition in time and/or with lower coding rate (e.g., with lower coding rate than is conventionally specified for the RRC connection request message). Thus, each of the messages of the random access procedure (or any subset of those messages) may be enhanced, to increase the likelihood for successful completion of the random access procedure when dealing with a UE device that is link budget limited.

In some embodiments, the PRACH preamble contains one or more instances of a Zadoff-Chu sequence, and may be transmitted repeatedly as part of a single RACH attempt. The base station may perform correlation data combining over two or more received instances of the PRACH preamble, thereby increasing the probability of successful decode of the PRACH preamble.

In some embodiments, the available Zadoff-Chu sequences (i.e., available for UE devices to use when attempting to perform random access) may be partitioned among a plurality of sets, each set being associated with a respective range of Doppler shift magnitude. A link-budget-limited UE device may measure its Doppler shift relative to the base station, and select one of the sets based on the measured Doppler shift magnitude. A Zadoff-Chu sequence from the selected set is used for the repeated transmissions of the PRACH preamble. The base station may perform correlation processing on the received instances of the PRACH preamble to identify the selected set. The identity of the selected set may be used to determine an appropriate method for combining correlation data records corresponding to the multiple received instances of the PRACH preamble (or the multiple received instances of the Zadoff-Chu sequence within the received instances of the PRACH preamble). A complex-valued combining method may be better for low Doppler cases while an energy combining method may be better for high Doppler cases. The techniques of complex-valued combining and energy combining are well known in the field of signal processing.

In some embodiments, the plurality of transmissions of the PRACH preamble may employ frequency domain hopping from one transmission to the next. The hopping pattern may also be signaled by the set selection. (The available Zadoff-Chu sequences may be partitioned among the plurality of sets so that different sets correspond to different hopping patterns. For example, each set may be associated with a unique pair of Doppler range and frequency hopping pattern.) By making the PRACH preamble hop in the frequency domain from one transmission to the next, frequency diversity is provided, which may improve on average the likelihood of successful decode of the PRACH preamble.

The multiple transmissions of the PRACH preamble may be performed according to one of a plurality of possible time repetition patterns. The time repetition pattern may be also be signaled by the set selection.

In some embodiments, a UE device that is link budget limited may be configured so that the first transmission of the PRACH preamble and the following transmission(s) of the PRACH preamble occur consecutively in time. (Each transmission of the PRACH preamble may span one or more consecutive subframes in time, and follow immediately after the one or more consecutive subframes containing the previous transmission of the PRACH preamble.) Thus, in these embodiments, the base station does not need to signal a time repetition pattern to the link-budget-limited UE devices.

In some embodiments, a UE device that is link budget limited may transmit a conventional PRACH preamble over one or more consecutive subframes, and immediately thereafter, transmit one or more repetitions of the conventional PRACH preamble. The presence of the one or more repetitions is a signal to the base station that the UE device is link budget limited. UE devices that are not link budget limited do not transmit the one or more repetitions. Thus, for each UE device attempting random access, the base station is able to determine whether that UE device is link budget limited or not by determining whether the one or more repetitions have been transmitted.

In some embodiments, a UE device may select from a special set of Zadoff-Chu sequences (different from a conventional set of sequences used by normal UE devices or legacy UE devices), to signal its status as a link-budget-limited device. The base station performs correlation processing on the one or more received instances of the PRACH preamble to determine the Zadoff-Chu sequence selected by a given UE device attempting random access, and determines whether the UE device is link budget limited or not based on whether that ZC sequence belongs to the special set or the conventional set.

In some embodiments, the link-budget-limited UE device may transmit PRACH information over successive available subframes in one or more consecutive radio frames, starting in a first available subframe of a first of the one or more consecutive radio frames. (Available subframes are defined by the signaled PRACH configuration, i.e., the PRACH configuration signaled by the base station.)

BRIEF DESCRIPTION OF THE DRAWINGS

FIG. 9 illustrates one embodiment of a method for operating a UE device to facilitate a random access procedure by a link-budget-limited UE device.

FIG. 10 illustrates one embodiment of a method for operating a base station to facilitate random access procedure for link-budget-limited UE devices.

FIGS. 11 and 12 illustrate two different embodiments of a method for operating a UE device to facilitate random access procedure by signaling Doppler category via sequence set selection.

FIGS. 13 and 14 illustrate two different embodiments of a method for operating a base station to facilitate random access procedure based on the signaling of Doppler category via sequence set selection.

FIG. 16 illustrates one embodiment of a method comprising the transmission of a plurality of instances of a PRACH over consecutive subframes of an uplink signal.

FIG. 17 illustrates one embodiment of a method comprising the reception and accumulation of a plurality of received instances of a PRACH.

FIG. 18 illustrates one embodiment of a method for a UE device to signal its link-budget-limited status to a base station, by transmission of a conventional PRACH preamble followed immediately by one or more repeated transmissions of the PRACH preamble. The conventional PRACH preamble transmission and the one or more repeated PRACH preamble transmissions are successive in time. Each transmission occupies a group of one or more consecutive subframes. Furthermore, the groups themselves may be consecutive in time, i.e., the first subframe of each group may immediately follow the last subframe of the previous group.

FIG. 19 illustrates one embodiment of a method comprising the transmission of a conventional PRACH immediately followed by one or more repetitions of the conventional PRACH.

FIG. 20 illustrates one embodiment of a method for determining if a given UE device attempting random access is link budget limited or not based on the presence or absence of one or more additional PRACH instances (i.e., in addition to one or more initial PRACH instances that are transmitted according to a conventional PRACH format) in an uplink signal.

FIG. 21 illustrates one embodiment of a method for determining if a given UE device attempting random access is link budget limited or not based on the presence or absence of one or more additional transmissions of a PRACH (i.e., in addition to an initial transmission of the PRACH) in an uplink signal.

FIG. 22 shows a portion of Table 5.7.2-4 ("Root Zadoff-Chu sequence order for preamble formats 0-3") from 3GPP TS 36.211.

FIG. 23 shows Table 5.7.2-2 ("Ncs for preamble generation, preamble formats 0-3") from 3GPP TS 36.211.

FIG. 24 shows a portion of Table 5.7.1-2 ("Frame structure type 1 random access configuration for preamble formats 0-3") from 3GPP TS 36.211.

FIG. 25 illustrates one embodiment of a method for a UE device to signal its link-budget-limited status to a base station, by selection from a special set of Zadoff-Chu sequences not used by conventional UE devices.

Figure 1:
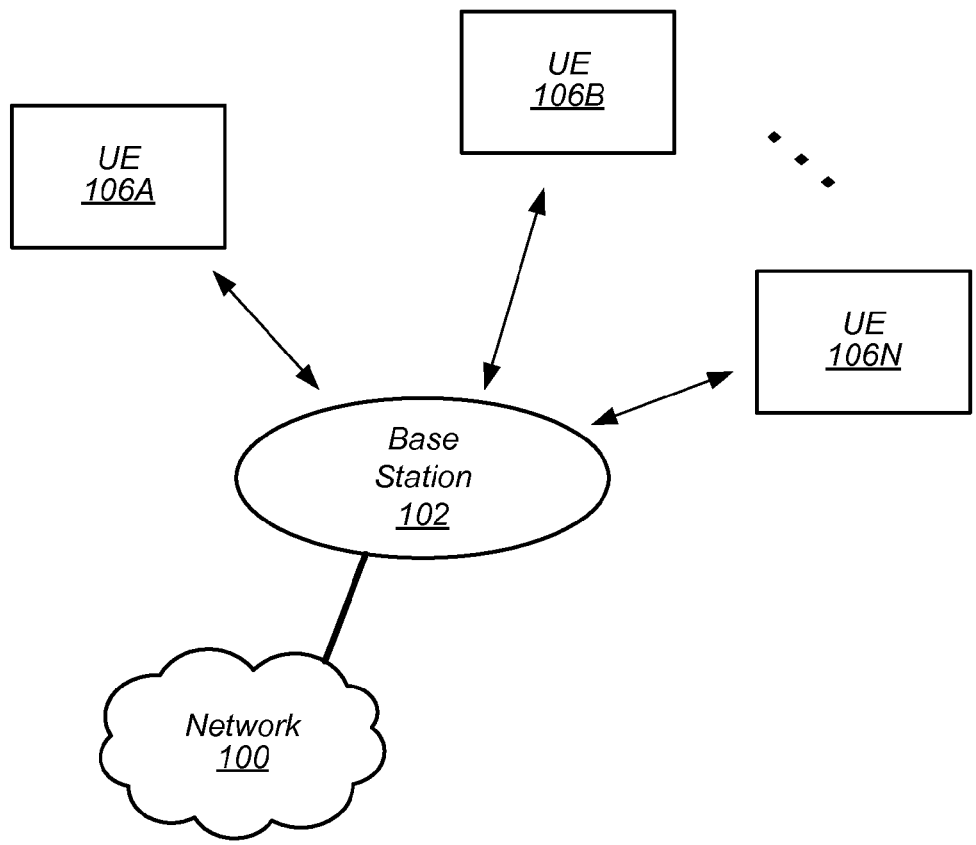
FIG. 1 illustrates an exemplary (and simplified) wireless communication system.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present disclosure. Definitions of the most prominently used acronyms that may appear throughout the present disclosure are provided below:

BS: Base Station
DL: Downlink
LTE: Long Term Evolution
MIB: Master Information Block
NW: Network
PBCH: Physical Broadcast Channel
PRACH: Physical Random Access Channel
PUSCH: Physical Uplink Shared Channel
RACH: Random Access Channel
RRC: Radio Resource Control
RRC IE: RRC Information Element
RX: Reception
SFN: System Frame Number
SIB: System Information Block
TTI: Transmit Time Interval
TX: Transmission
UE: User Equipment
UL: Uplink
UMTS: Universal Mobile Telecommunication System
ZC sequence: Zadoff-Chu sequence
3GPP: Third Generation Partnership Project

Terminology

The following is a glossary of terms that may appear in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
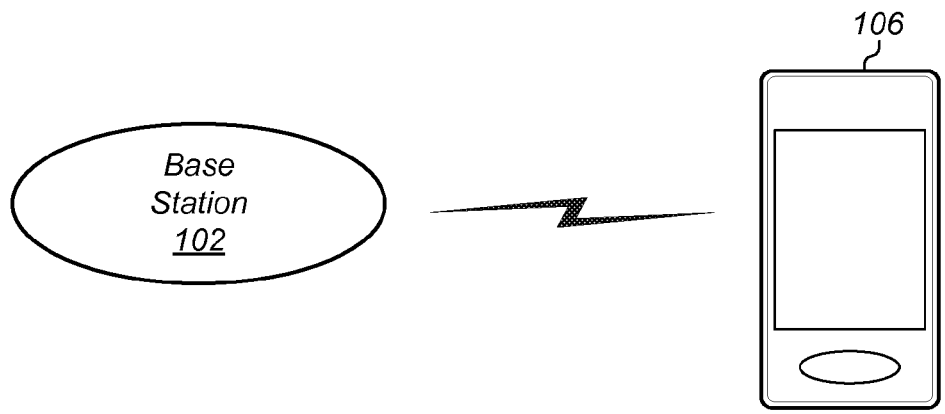
FIG. 2 illustrates a base station in communication with a wireless user equipment (UE) device.

FIGS. 1 and 2—Communication System

FIG. 1 illustrates an exemplary (and simplified) wireless communication system. It is noted that the system of FIG. 1 is merely one example of a possible system, and embodiments disclosed herein may be implemented in any of various systems, as desired.

As shown, the exemplary wireless communication system includes a base station 102 which communicates over a transmission medium with one or more user devices 106-A through 106-N. Each of the user devices may be referred to herein as a "user equipment" (UE) or UE device. Thus, the user devices 106 are referred to as UEs or UE devices.

The base station 102 may be a base transceiver station (BTS), and may include hardware that enables wireless communication with the UEs 106A through 106N. The base station 102 may also be equipped to communicate with a network 100 (e.g., an infrastructure network of a wireless services provider, a core network of a cellular service provider, a telecommunication network such as a public switched telephone network (PSTN), and/or the Internet, among various possibilities). Thus, the base station 102 may facilitate communication between the user devices and/or between the user devices and the network 100. The communication area (or coverage area) of the base station may be referred to as a "cell."

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1×RTT, 1×EV-DO, HRPD, eHRPD), Wi-Fi, WiMAX, etc.

UE 106 may be configured to communicate using multiple wireless communication standards. For example, a UE 106 might be configured to communicate using a 3GPP cellular communication standard (such as LTE) and/or a 3GPP2 cellular communication standard (such as a cellular communication standard in the CDMA2000 family of cellular communication standards). Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 may also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106-A through 106-N) in communication with the base station 102. The UE 106 may be a device with wireless network connectivity such as a mobile phone, a hand-held device, a computer or a tablet, a wearable device, or any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using one or more wireless communication protocols. For example, the UE 106 may be configured to communicate using one or more of CDMA2000, LTE, LTE-A, WLAN, GNSS, etc.

The UE 106 may include one or more antennas for communicating using one or more wireless communication protocols. In some embodiments, the UE 106 may share one or more parts of a receive chain and/or transmit chain between multiple wireless communication standards. The shared radio may include a single antenna, or may include multiple antennas (e.g., for MIMO operation) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1×RTT, and separate radios for communicating using each of Wi-Fi and Bluetooth. Other configurations are also possible.

Figure 3:
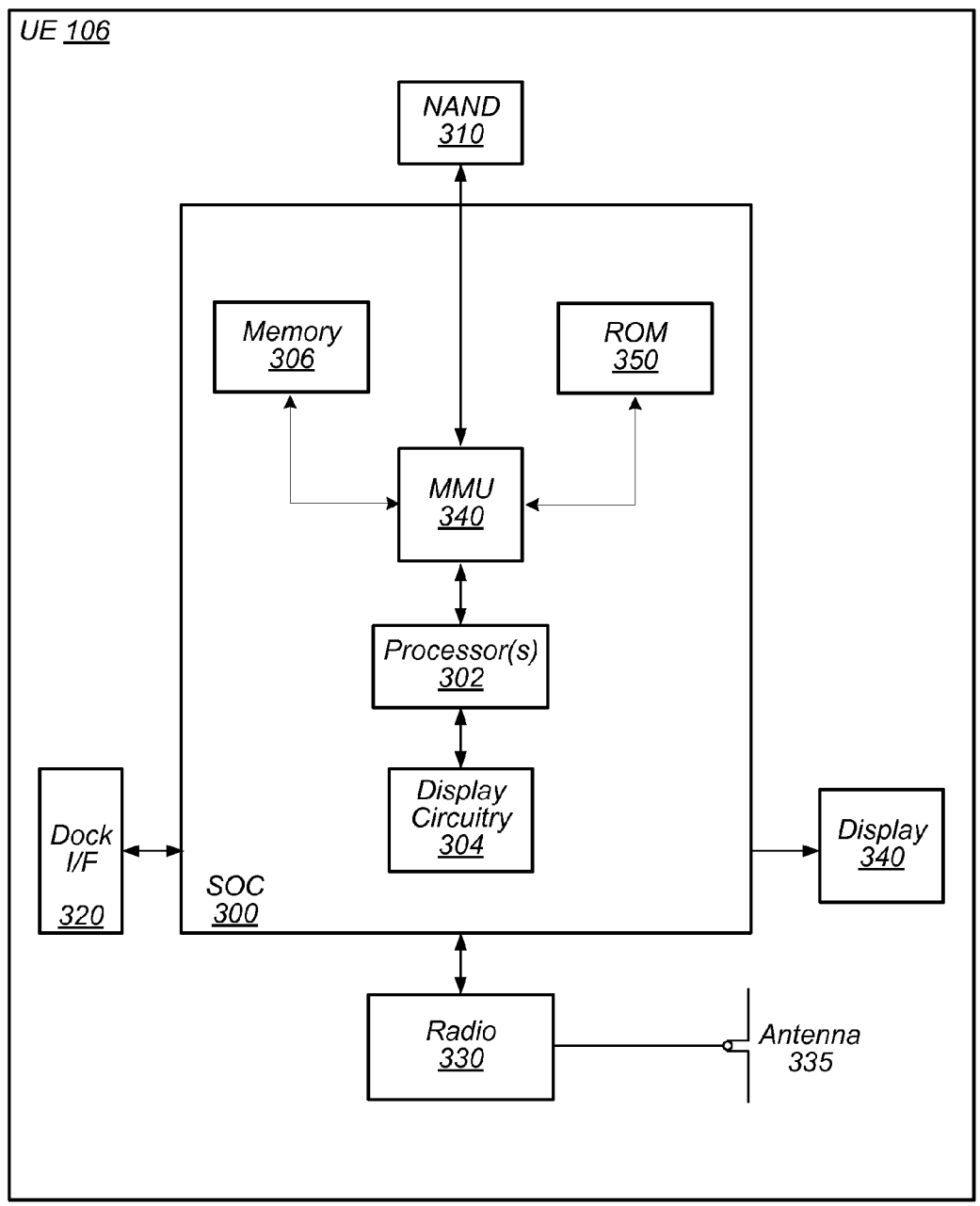
FIG. 3 illustrates a block diagram of a UE, according to one embodiment.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 340. The processor(s) 302 may also be coupled to memory management unit (MMU) 305, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector interface 320, and/or display 340. The MMU 305 may be configured to perform memory protection and page table translation or set up. In some embodiments, the MMU 305 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 340, and wireless communication circuitry (e.g., for LTE, LTE-A, CDMA2000, Bluetooth, Wi-Fi, GPS, etc.). The UE device 106 includes at least one antenna, and may include multiple antennas, for performing wireless communication with base stations and/or other devices. For example, the UE device 106 may use antenna system 335 to perform the wireless communication.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

Figure 4:
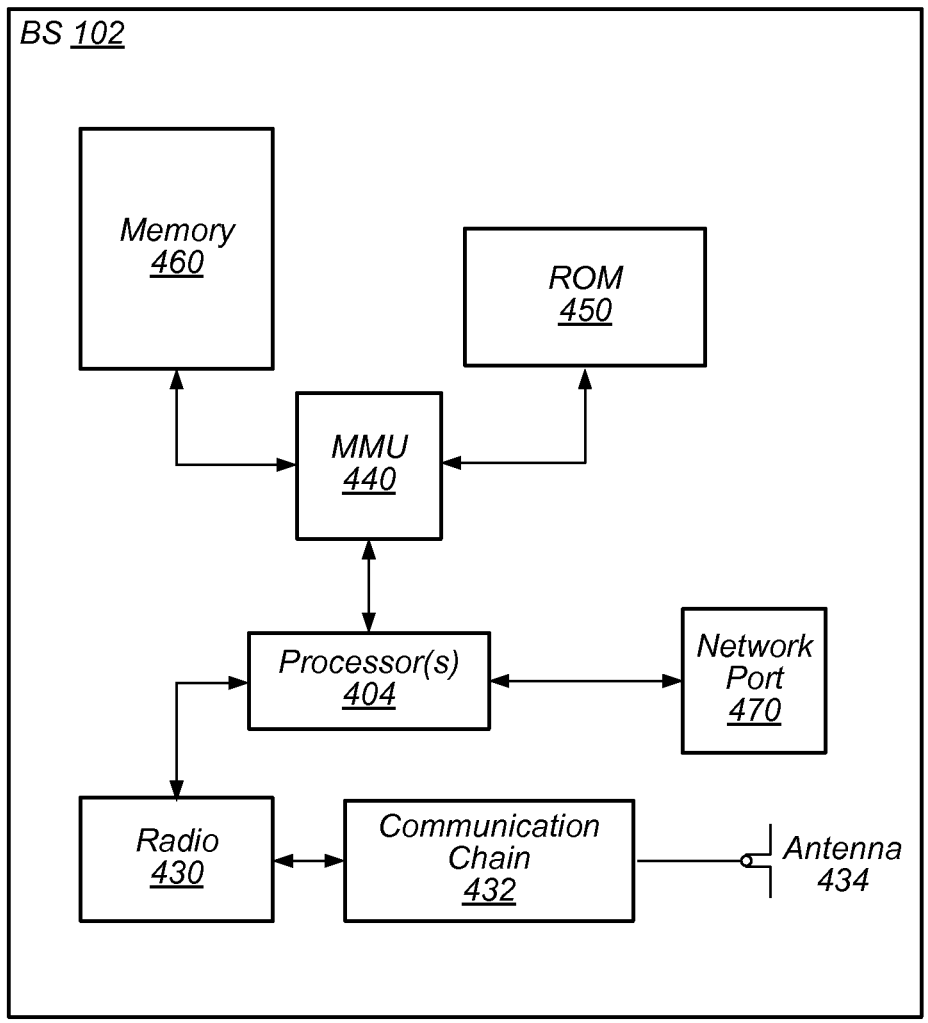
FIG. 4 illustrates a block diagram of a base station, according to one embodiment.

FIG. 4—Exemplary Block Diagram of a Base Station

FIG. 4 illustrates a block diagram of a base station 102. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434. (In some embodiments, the base station includes a plurality of antennas in each of two or more sectors.) The at least one antenna 434 may be configured to operate as a wireless transceiver and may be further configured to communicate with UE devices 106 using radio 430. The antenna 434 communicates with the radio 430 via communication chain 432. Communication chain 432 may be a receive chain, a transmit chain or both. The radio 430 may be configured to communicate via one or more wireless telecommunication standards, e.g., standards such as LTE, LTE-A WCDMA, CDMA2000, etc. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

Background and Problem Statement

In LTE, the random access procedure (referred to herein as "RACH") is a procedure for synchronizing the UE device with the network (NW). RACH may be used for one or more of the following: initial access by the UE device to the NW; handover of the UE device from one cell to another; RRC re-establishment; uplink and/or downlink data arrival; positioning in RRC connected. RACH is an important procedure to allow the UE device to access the NW, to synchronize with uplink signals from different UE devices, and to obtain orthogonal resources. Thus, it is important to ensure that its detection by the NW is successful. Different methods are used currently in 3GPP Specifications as follows: (a) use of different PRACH preambles—orthogonal preambles or preambles with good cross-correlation properties—by different UE devices; (b) multiple RACH attempts (depending on the NW configuration) by the UE device; (c) ramp up of power over successive RACH attempts.

If the UE device is link budget limited, a mechanism to alleviate the effect of bad reception of PRACH (Physical Random Access Channel) is needed. A UE device may be link budget limited, e.g., if its antenna system is poorly performing or if the UE device is in a location where the signal cannot be received (such as the basement of a building, etc.)

PRACH Specifications in 3GPP

Figure 5A:
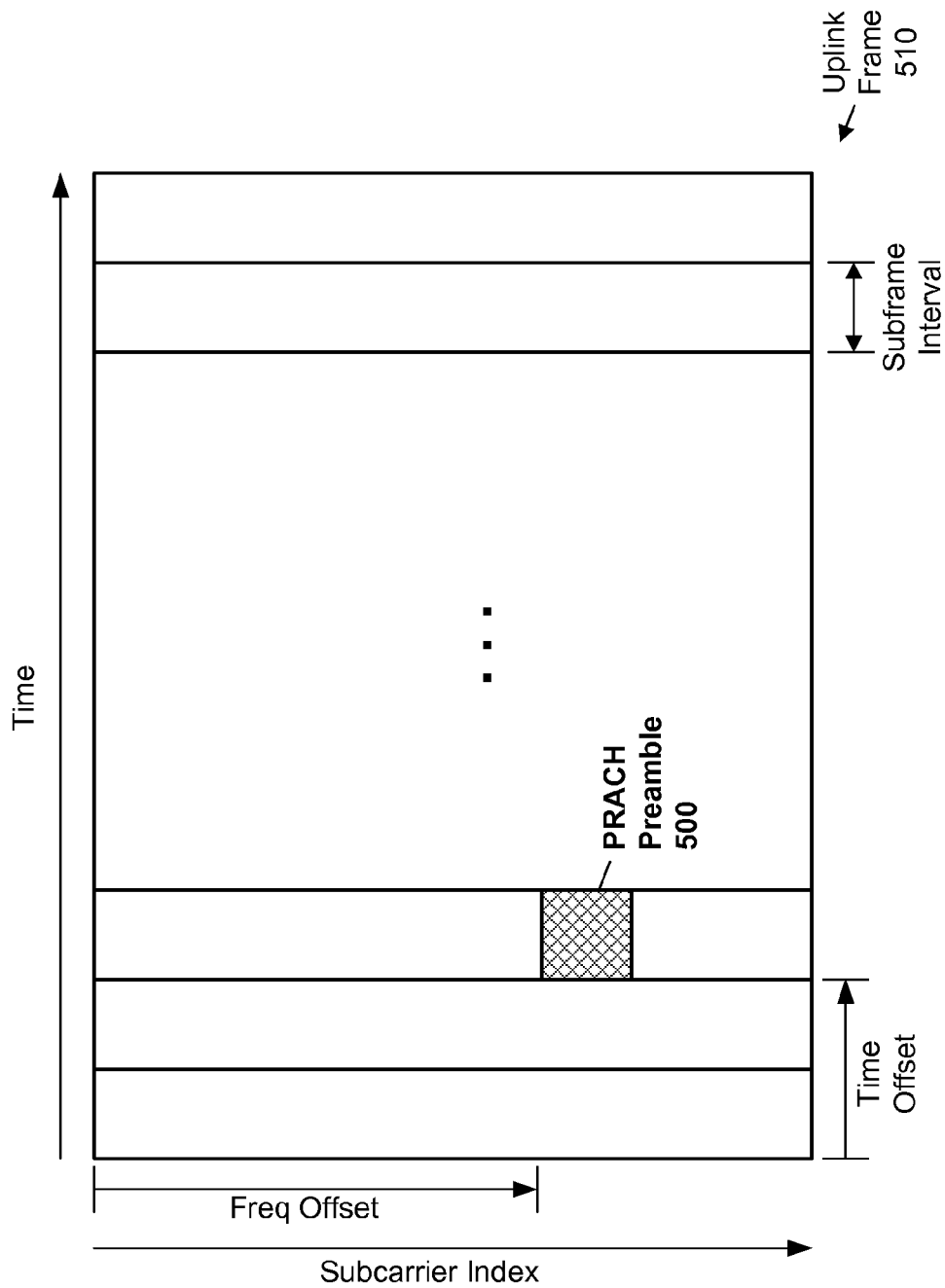
FIG. 5A illustrates a PRACH preamble being transmitted as part of an uplink frame.

FIG. 5A illustrates a preamble 500 in a Physical Random Access Channel (PRACH) according to the existing LTE specifications. A UE device transmits the PRACH preamble in an uplink frame 510 in order to initiate the random access procedure. (The uplink frame includes a plurality of sub-frames.) The time offset and frequency offset of the PRACH preamble within the uplink frame may be determined by the higher layer signaling.

Figure 5B:
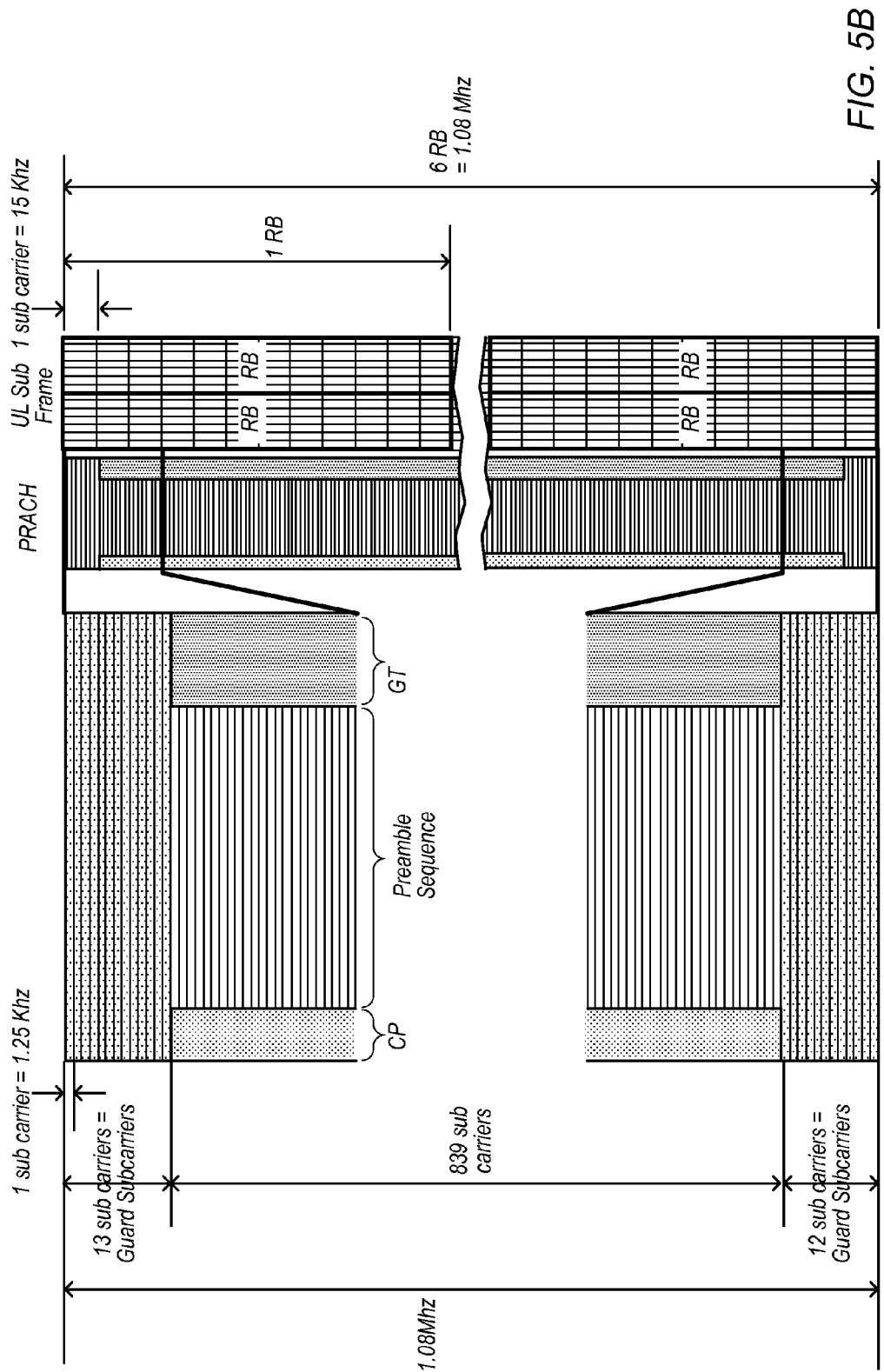
FIG. 5B illustrates the structure of a conventional PRACH, according to one possible format.

FIG. 5B illustrates one particular realization of the PRACH preamble according to existing LTE specifications. In frequency, the PRACH preamble (including the guard subcarriers at the beginning and end) spans 6 RBs=1.08 MHz. In time, the PRACH preamble, including the cyclic prefix (CP) and guard time (GT), spans one uplink sub frame.

Formats 0-3 for the PRACH preamble each use a Zadoff-Chu sequence of length 839, whereas format 4 uses a Zadoff-Chu sequence of length 139.

The PRACH preamble occupies 6 resource bocks (RBs) in uplink bandwidth (UL BW).

One PRACH subcarrier occupies 1.25 kHz whereas a normal UL subcarrier occupies 15 kHz. The symbols of the Zadoff-Chu sequence are transmitted on respective ones of the PRACH subcarriers.

Figure 6:
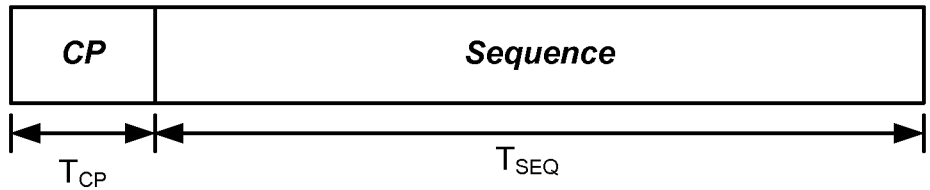
FIG. 6 illustrates a cyclic prefix (CP) and sequence portion of a PRACH.

With respect to the PRACH preamble, FIG. 6 illustrates a cyclic prefix (CP) of duration $T_{CP}$ and a sequence portion of duration $T_{SEQ}$. (The sequence portion contains the Zadoff-Chu sequence.) Table 1 below shows the values of $T_{CP}$ and $T_{SEQ}$ in different formats of the PRACH preamble.

TABLE 1

Random Access Preamble Parameters

| Preamble Format | $T_{CP}$ | $T_{SEQ}$ |
|---|---|---|
| 0 | 3168 * $T_S$ | 24576 * $T_S$ |
| 1 | 21024 * $T_S$ | 24576 * $T_S$ |
| 2 | 6240 * $T_S$ | 2 * 24576 * $T_S$ |
| 3 | 21024 * $T_S$ | 2 * 24576 * $T_S$ |
| 4 | 448 * $T_S$ | 4096 * $T_S$ |

Summary of RACH Procedure

Figure 7:
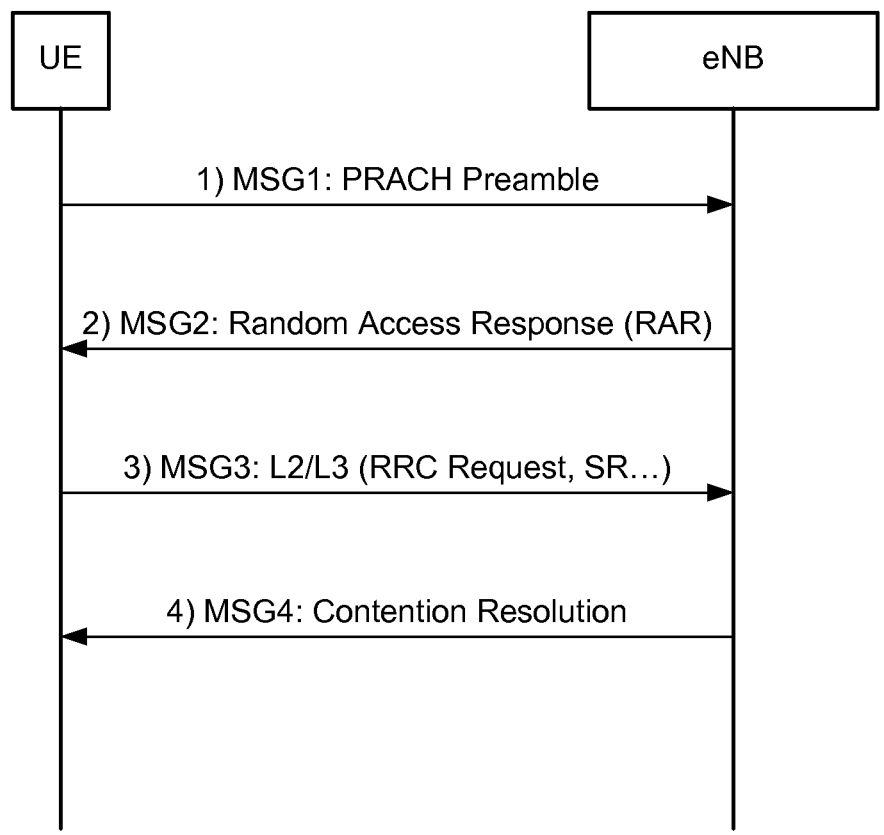
FIG. 7 illustrates one embodiment of messages exchanged between a user equipment (UE) device and base station (e.g., eNodeB) as part of a random access procedure.

The RACH procedure may involve a series of messages sent between the UE and the base station, as shown in FIG. 7.

In a first message (MSG1), the UE transmits the PRACH preamble to the base station (i.e., eNodeB in the parlance of LTE). The PRACH preamble may be configured according to one of the formats discussed above.

In response to decoding the first message, the eNodeB transmits a second message (MSG2). The second message may be referred to as a random access response (RAR).

In response to decoding the second message, the UE may transmit a third message (MSG3). The content of the third message may be different in different contexts, e.g., may depend on the purpose for which the RACH procedure has been invoked. For example, the third message may include an RRC Request, SR, etc. (SR is an acronym for Scheduling Request.)

In response to receiving the third message, the eNodeB may transmit a fourth message (MSG4), e.g., a contention resolution message.

PRACH Proposal for Range Extension

In some embodiments, we create a new set of preambles and resources (in the time and/or frequency domain) specifically for use by link-budget-limited UE devices (e.g., range-constrained UE devices).

To improve the robustness of the PRACH preamble transmission, the numerology of the PRACH preamble may be changed, where the numerology includes one or more of the following:

the ZC (Zadoff-Chu) sequence length;
the subcarrier spacing of the PRACH preamble;
the number of subframes spanned by the PRACH preamble; and
the number of repetitions of the ZC sequence in the PRACH preamble.

In some embodiments, one or more of the new preambles may span a plurality of subframes.

Another way to improve robustness is to configure the UE to transmit a plurality of instances of the PRACH preamble as part of a single random access attempt. This feature enables the eNB to gain the benefit of combining the time-domain repetitions of the PRACH preamble. Currently in 3GPP specifications, each RACH attempt includes only a single transmission of the conventional PRACH preamble, and that RACH attempt is treated independently by the NW, i.e., independent of any other RACH attempt. If the UE does not receive MSG2, the UE will make another RACH attempt.

To enable the eNB to combine PRACH repetitions, the eNB may need to know the time of transmission of each instance of the PRACH preamble. For example, in some embodiments, the eNB may need to know: the starting time of the first repetition (i.e., the first of a plurality of instances of the PRACH preamble); the period of time that spans all the repetitions (or, the number of repetitions and the interval of time between successive repetitions). In some embodiments, link-budget-limited UE devices use one of the presently-disclosed robust formats to send each repetition of the PRACH preamble while devices that are not link budget limited send the PRACH preamble (without repetition) using a conventional format.

In some embodiments, a link-budget-limited UE device may transmit a plurality of repetitions of the PRACH preamble over a set of consecutive subframes. For example, the PRACH preamble may span one subframe in time, and the link-budget-limited UE device may transmit one PRACH preamble repetition in each of the consecutive subframes. As another example, the PRACH preamble may span two subframes in time, and the link-budget-limited UE device may transmit one PRACH preamble repetition in each successive pair of the consecutive subframes. Thus, the eNB may need to know the starting time of the first repetition, and the number of PRACH repetitions.

In some embodiments, the robustness of MSG2 and MSG3 of the random access procedure may also need to be improved. Hence, an early indication to the NW that the UE device is link budget limited may be needed. That indication may be provided by the RRC layer signaling.

The present patent discloses a number of new formats for the PRACH preamble, including the formats described below.

New Format A for the PRACH Preamble

The new format A for the PRACH preamble may occupy 3 ms in time domain.

The new subcarrier spacing for format A may be 1.5 kHz. With a subcarrier spacing of 1.5 kHz, one can fit 720 subcarriers in 1.08 MHz. The ZC sequence length needs to be a prime number. Any of the following sequence lengths may be used for format A:

Nzc=719, 1 subcarrier is left as guard band;
Nzc=709, 6 subcarriers on the left and 5 on the right are left as guard band;
Nzc=701, 10 subcarriers on the left and 9 on the right are left as guard band;
Nzc=691, 15 subcarriers on the left and 14 on the right are left as guard band.

Figure 8A:
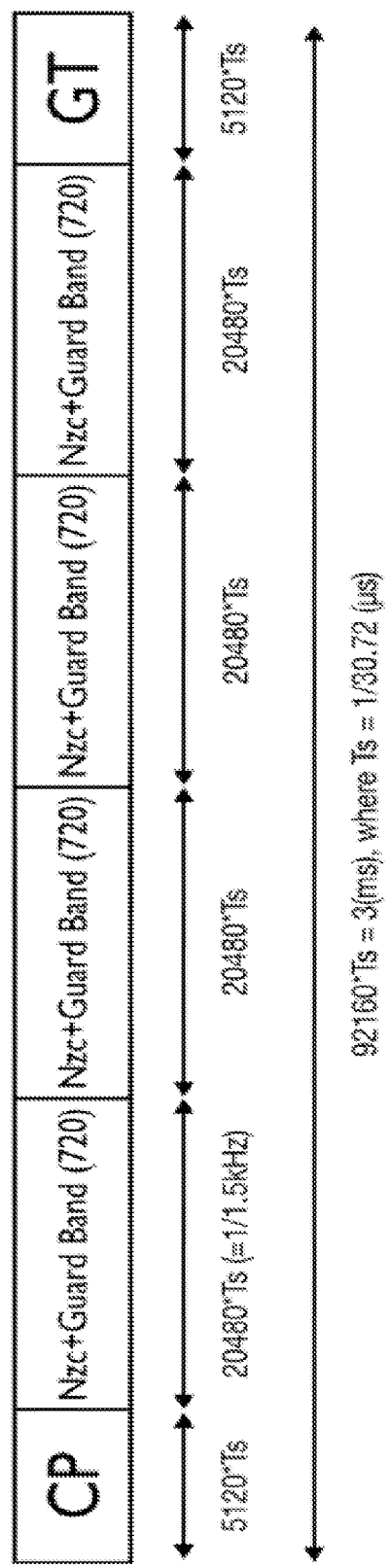
FIG. 8A illustrates an embodiment of a PRACH preamble format A, including four Zadoff-Chu sequences.

Tseq for format A may be 81920 Ts=4×20480 Ts, where Ts=1/30.72 microseconds. This implies that 4 ZC sequences can be repeated in 3 subframes. FIG. 8A illustrates an embodiment of how the 4ZC sequences may be embedded in the PRACH preamble.

For format A, Tcp=5120 Ts and GT=5120 Ts. (CP denotes the Cyclic Prefix. GT denotes the Guard Time.)

New Format B for the PRACH Preamble

The new format B for the PRACH preamble may occupy 3 ms in time domain.

The new subcarrier spacing for format B may be 2.5 kHz. With a subcarrier spacing of 2.5 kHz, one can fit 144 subcarriers in 360 kHz (2 RBs). The ZC sequence length needs to be a prime number. Any of the following sequence lengths may be used for format B:

Nzc=139, 2 subcarriers on the left and 2 on the right are left as guard band;

Nzc=131, 7 subcarriers on the left and 6 on the right are left as guard band (the guard band is 13×2.5 kHz which is comparable to 25×1.25 kHz as per current 3GPP specifications).

For format B, Tseq may be 86016 Ts=7×12288 Ts, where Ts=1/30.72 microsec. This means 7 ZC sequences can be repeated in 3 subframes.

For format B, Tcp=3168 Ts and GT=2976 Ts.

New Format C for the PRACH Preamble

The new format C for the PRACH preamble may occupy 1 ms in time domain.

The subcarrier spacing for format C may be 1.25 kHz. With a subcarrier spacing of 1.25 KHz, we can fit 288 subcarriers in 360 kHz (2 RBs). The ZC sequence length needs to be a prime number. Thus, for example, the following sequence lengths could be used for format C:

Nzc=263, 13 subcarriers on the left and 12 on the right are left as guard band.

For format C, Tseq may be 24576 Ts with Ts=1/30.72 microsec, Tcp=3168 Ts and GT=2976 Ts.

New Format D for the PRACH Preamble

The new format D for the PRACH may occupy 1 ms in the time domain.

The subcarrier spacing for format D may be 2.5 kHz. With a subcarrier spacing of 2.5 kHz, we can fit 144 subcarriers in 360 kHz (2 RBs). The ZC sequence length needs to be a prime number. Thus, for example, the following sequence lengths could be used:

Nzc=139, 3 subcarriers on the left and 3 on the right are left as guard band.

Nzc=131, 5 subcarriers on the left and 4 on the right are left as guard band (the guard band is 13×2.5 kHz which is comparable to 25×1.25 kHz as per current 3GPP specifications).

In format D, Tseq may be 24576 Ts=2×12288 Ts, with Ts=1/30.72 microsec. This means that 2 ZC sequences can be repeated in one TTI.

It can also be envisioned that in the subcarrier spacing case above (i.e., the case of 2.5 KHz subcarrier spacing), the whole PRACH preamble occupies only a half subframe (1 slot), i.e., one ZC sequence occupying 12288 Ts with Tcp=3168/2=1584 Ts and GT=2976/2=1488 Ts.

It should be understood that formats A through D illustrate only a few of a wide variety of possible PRACH formats constructible according to the principles herein described.

Notes Regarding Use of Formats A-D

In any of the PRACH formats, a link-budget-limited UE device may transmit the PRACH preamble a plurality of times (in the time domain) as part of a single random access attempt. PRACH formats C and D may require more numerous retransmissions than formats A and B since formats C and D have fewer instances of the ZC sequence per PRACH preamble.

In formats C and D, the 2 RBs occupied by the PRACH preamble can be adjacent or non-adjacent in the frequency domain (e.g., at the upper and lower edges of the uplink bandwidth, wherein the uplink bandwidth may be, e.g., 1.4 MHz, 5 MHz or 10 MHz) to provide frequency diversity.

While the PRACH preamble is repeated in the time domain, the locations of the 2 RBs can hop in the frequency domain from one repetition to the next, to provide frequency diversity.

While various ones of the PRACH formats described herein are configured to use 2 RBs for the PRACH preamble, other numbers of RBs may be used in other embodiments.

Time Repetition of the New PRACH Preamble

In order for the eNB to accumulate multiple repetitions of the PRACH preamble (transmitted by the link-budget-limited UE device), the eNB may need to know the repetition pattern and the duration. In some embodiments, we propose to have multiple configurations, where each configuration has a corresponding pattern of repetition.

In order to accumulate, the eNB needs to know what the duration is. For example, the new PRACH preamble may be sent the first time in a frame whose SFN satisfies SFN %20=0, and may be repeated once in the immediately following frame, i.e., 1 SFN later. (M % N is shorthand notation for "M modulo N". SFN is an acronym for "System Frame Number".) Currently in the 3GPP specifications, the configuration of the conventional PRACH preamble is given in the following table, which is a copy of Table 5.7.1-2 from specification 3GPP TS 36.211. (TS is an acronym for Technical Specification.)

TABLE 2

PRACH Configuration Example

| PRACH Config. Index | Preamble Format | System Frame Number (SFN) | Subframe Number |
|---|---|---|---|
| 0 | 0 | Even | 1 |
| 1 | 0 | Even | 4 |
| 2 | 0 | Even | 7 |
| 3 | 0 | Any | 1 |

In some embodiments, we propose expanding this table, e.g., by adding one or more of the following items: a column to indicate the SFN of the first transmission of the PRACH preamble; a column for the number of repetitions of the PRACH preamble after the first transmission; a column for the time locations of the repetitions with respect to the first transmission; and a column to indicate the frequency hopping pattern for the RBs of the PRACH preamble across the plurality of repetitions.

The UE device may detect the SFN from the MIB in the PBCH of the downlink signal transmitted by the eNB. For handover, however, the UE does not need to read the MIB before initiating a random access procedure (RACH).

In some embodiments, in order to solve this problem of knowing the SFN of the target cell, we propose one or more of the following.

(1) Modify the UE implementation so that the UE proactively reads the MIB of the target cell before initiating a RACH procedure. (The "target cell" means the cell that the UE is being handed over to.)

(2) For LTE Release 12 and beyond, all the eNBs will eventually be SFN synchronized, so the SFN of the origin cell and target cell will be similar. Therefore, the UE knows the SFN of the target cell, assuming it has already entered the network.

(3) Modify the RRC IE MobilityControlInfo in the RRC specification (in TS 36.331) by adding the SFN of the target cell to this information element.

New Configuration Index Signaling

In some embodiments, the NW may signal two configurations, one for normal UEs and one for link-budget-limited UEs.

RRC IE PRACH-Config may be extended to include a RangeConstrainedPrach-ConfigIndex.

The resources used for the link-budget-limited UEs may be reserved and distinct from the resources used by the normal UEs (i.e., UEs that are not link budget limited). The eNBs will be then able to detect such preambles.

In some embodiments, a link-budget-limited UE will signal to the NW its status as a link-budget-limited UE by sending a PRACH preamble using a new PRACH format (e.g., one of the new formats described above). In contrast, a UE that is not link budget limited may signal to the NW its status of being "not link budget limited" by sending a PRACH preamble using a conventional PRACH format. Thus, the eNB may determine the status of any given UE by determining which format the UE has used to transmit the PRACH preamble.

The eNB will then send MSG2 such that the probability of successful decode of MSG2 by the UE is sufficiently large, e.g., by lowering the coding rate for the transmission of MSG2 and/or repeating in time (TTI Bundling) the transmission of MSG2. Similarly, the UE may send the MSG3 such that the probability of successful decode of MSG3 by eNB is sufficiently large, e.g., by lowering the coding rate for the transmission of MSG2 and/or repeating in time the transmission of MSG3. (The resources for MSG3 may be provided in MSG2 payload.)

In some embodiments, the eNB may also decide to offload the link-budget-limited UEs (or a subset thereof) to one or more small cells that have better coverage than the eNB.

The following table describes PRACH-Config field descriptions.

| PRACH-Config field descriptions |
|---|
| rootSequenceIndex |
| Parameter: RACH_ROOT_SEQUENCE, see TS 36.211 [21, 5.7.1]. |
| prach-ConfigIndex |
| Parameter: prach-ConfigurationIndex, see TS 36.211 [21, 5.7.1]. |
| highSpeedFlag |
| Parameter: High-speed-flag, see TS 36.211, [21, 5.7.2].TRUE corresponds to Restricted set and FALSE to Unrestricted set. |
| zeroCorrelationZoneConfig |
| Parameter: Ncs configuration, see TS 36.211, [21, 5.7.2: table 5.7.2-2] for preamble format 0..3 and TS 36.211, [21, 5.7.2: table 5.7.2-3] for preamble format 4. |
| prach-FreqOffset |
| Parameter: prach-FrequencyOffset, see TS 36.211, [21, 5.7.1]. For TDD the value range is dependent on the value of prach-ConfigIndex. |

PRACH Repetition in Frequency

Figure 8B:
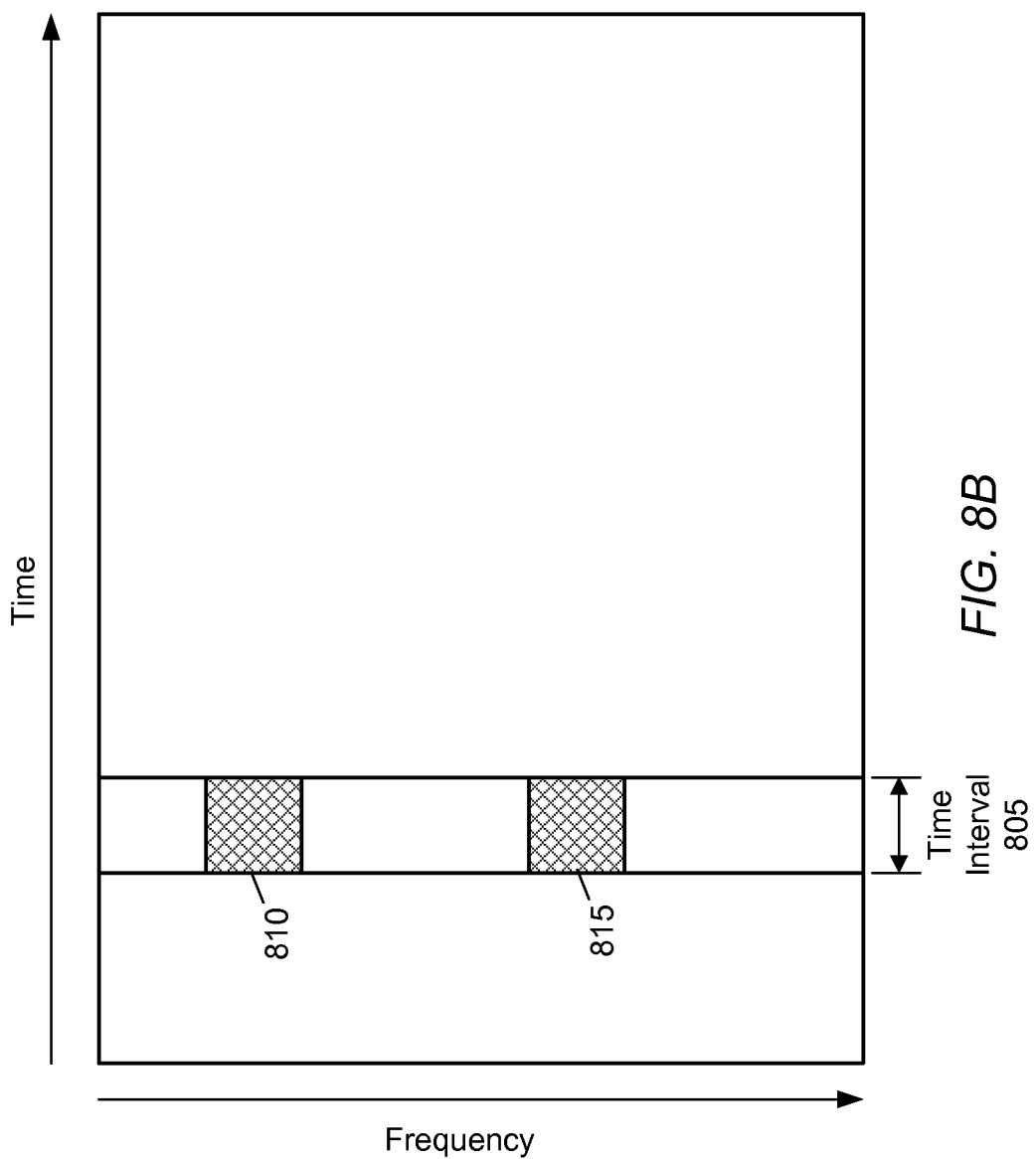
FIG. 8B illustrates one embodiment of a PRACH, including a plurality of segments in the frequency domain.

In some embodiments, as part of a single random access attempt, a link-budget-limited UE device may repeat the new RACH format in the frequency domain (in addition to, or as an alternative to, the above-described repetition in the time domain). FIG. 8B illustrates a PRACH preamble transmission including two segments 810 and 815, which occupy disjoint portions of the UL frequency band, but occupy the same interval 805 in time. (While FIG. 8B illustrates a PRACH preamble transmission including two segments, more generally, any number of segments may be included in the PRACH preamble transmission.) Each of the segments may be identical in content and structure, e.g., may include the same number of instances of the same ZC sequence. The segments could be separated in the frequency domain to provide the benefit of frequency diversity, e.g., 3 RBs (or 1 RB) at the upper end of the system bandwidth and the other 3 RBs (or 1 RB) at the lower end of the system bandwidth. Each segment may be formatted as variously described above.

In some embodiments, an initial PRACH preamble transmission may be followed by a temporal sequence of one or more re-transmissions of the PRACH preamble, e.g., as variously described above. Each of the PRACH preamble transmissions (i.e., initial transmission and re-transmissions) may include a plurality of segments as described immediately above. For example, each PRACH preamble transmission may occupy a corresponding period in time but different portions of the UL frequency band.

Doppler Indication by PRACH Sequence

As explained above, the PRACH sequence can be sent across multiple subframes that are separated in time. In order to obtain a maximum gain while detecting the sequence by the eNB, the eNB may need to know the Doppler shift or the range of Doppler shift. If the Doppler shift is small in magnitude, then the eNB can combine the complex values of the cross-correlation across multiple subframes since the channel has not changed much between subframes. However, if the Doppler shift is large in magnitude, then the eNB can compute the energy values corresponding to the complex values (i.e., $z \rightarrow |z|^2 = zz^*$), and combine the energy values across multiple subframes instead of the complex values.

In some embodiments, we propose to divide the ZC sequences into a plurality of sets (e.g., 2 or 3 sets). For example, a first set of the ZC sequences may be assigned for use when Doppler shift is low, a second set of ZC sequences may be assigned for use when Doppler shift is medium, and a third set of ZC sequences may be assigned for use when Doppler shift is high.

We may assume that the UE and eNB have agreed upon the definition of these sequence sets.

The UE could use its sensors (e.g., motion sensors) to measure the Doppler shift.

The UE may select one of the sequence sets based on the measured Doppler. The UE will use a ZC sequence from the selected sequence set to perform the multiple transmissions of the PRACH. By correlating against the space of possible ZC sequences, the eNB can identify the employed ZC sequence and the selected set. The identity of the selected set informs the eNB of the category of Doppler magnitude (e.g., low, medium, high), and thus, which correlation combining method will be most effective for the present series of PRACH transmissions. This mechanism for signalling Doppler category will improve the PRACH detection by the eNB.

Set Identity Mapping to Doppler Category, Time Pattern and Frequency Hopping Pattern In some embodiments, the ZC sequence sets defined for different Doppler categories are also associated with different repetition patterns in time and different frequency domain hopping patterns. In some embodiments, there are 3 sets, where each set is associated with: a corresponding Doppler category (e.g., low or medium or high); a temporal pattern for the PRACH transmissions, defining the set of TTIs where the PRACH transmissions occur in time domain; and a corresponding frequency-hopping pattern, defining the set of frequency domains RBs occupied by the hopping pattern. For example, in one embodiment, the three sets are defined as follows:

Set S1 for Low Doppler: includes 20 sequences; first transmission of PRACH sent on subframe 1, repeated every SFN for 4 SFNs; hopping within the range RB0:15. (RB is an acronym for "Resource Block". RB0:15 is notation for the resource block range given by block numbers {0, 1, ..., 15}.)

Set S2 for Medium Doppler: includes 15 sequences; first transmission of PRACH sent on subframe 3, repeated transmission every SFN for 4 SFNs; hopping within the range RB16:33.

Set S3 for High Doppler: includes 10 sequences; first transmission of PRACH sent on subframe 2, repeated transmission every SFN for 4 SFNs; hopping within the range RB35:48.

Method 900 for Operating a User Equipment Device

In one set of embodiments, a method 900 for operating a user equipment (UE) device may be performed as illustrated in FIG. 9. (Method 900 may also include any subset of the features, elements and embodiments described above.) The method 900 may be performed by a link-budget-limited UE device to facilitate a random access procedure. The method may be implemented by a processing agent of the link-budget-limited UE device. The processing agent may be realized by one or more processors executing program instructions, by one or more programmable hardware elements, by one or more dedicated hardware devices such as ASICs, or by any combination of the foregoing.

The method may include transmitting a first message including at least three instances of a Zadoff-Chu sequence, as indicated at 910. (For example, in format A it is repeated 4 times, and in format B it is repeated 7 times.) The first message may be transmitted on a physical random access channel (PRACH) within a time-frequency resource space. The larger number of ZC instances allows for higher probability of message decoding by the base station.

In some embodiments, the method 900 may also include performing one or more retransmissions of the first message, wherein said transmission and said one or more retransmissions occur according to a pattern of times determined by configuration information transmitted by a first base station. (The initial transmission of the first message and the one or more retransmissions occur as part of a single random access attempt by the link-budget-limited UE device.) Thus, the base station can predict when the transmission and one or more retransmissions will occur, and can combine two or more received versions of the first message, resulting in increased probability of successful decoding.

In some embodiments, the configuration information determines the pattern of times so that a first set of time-frequency resources usable by the UE device to perform said transmission and said one or more retransmissions is different from a second set of time-frequency resources usable by one or more other UE devices (e.g., UE devices that are not link budget limited) to transmit conventional random access preambles. Each of the conventional random access preambles includes at most two instances of a Zadoff-Chu sequence.

In some embodiments, the method 900 may also include: when a handover of the UE from the first base station to a second base station is being performed, receiving a master information block (MIB) from the second base station prior to said transmitting the first message, wherein the MIB includes a system frame number (SFN) associated with the second base station, wherein the system frame number is used to determine when a time has arrived for performing said transmitting the first message.

In some embodiments, the method 900 may also include: when a handover of the UE from the first base station to a second base station is being performed, determining when a time has arrived for performing said transmission of the first message based on a system frame number received from the first base station, wherein the system frame number is synchronized between the first base station and the second base station.

In some embodiments, the method 900 may also include: when a handover of the UE from the first base station to a second base station is being performed, receiving a radio resource control (RRC) information element transmitted by the first base station. The RRC information element may include a system frame number associated with the second base station. The system frame number may be used to determine when a time has arrived for performing said transmission of the first message.

In some embodiments, the action of transmitting the first message and said one or more retransmissions are performed in response to stored information indicating that the UE is link budget limited (e.g., by virtue of being equipped with a poorly performing antenna system).

In some embodiments, the action of transmitting the first message and said one or more retransmissions are performed in response to the UE determining that the UE is operating in a link-budget-limited condition.

In some embodiments, the method 900 may also include: prior to the action of transmitting the first message, receiving the configuration information transmitted by the base station. The base station may transmit the configuration information, e.g., as part of the system information block SIB2.

In some embodiments, the configuration information identifies the pattern of times from a predefined set of timing patterns, wherein each of the timing patterns. For example, each timing pattern may indicate allowed times for said transmission of the first message and a corresponding inter-transmission time spacing for the one or more retransmissions.

In some embodiments, the first message includes a plurality of subcarriers for conveying said at least three instances of the Zadoff-Chu sequence, wherein a spacing of the subcarriers is greater than 1.25 kHz.

In some embodiments, the first message spans more than one transmission time interval (TTI).

In some embodiments, the method 900 may also include: receiving a second message (e.g., a random access response) transmitted by a base station, wherein the second message is transmitted by the base station in response to the base station successfully decoding the first message.

In some embodiments, the second message is transmitted by the base station two or more times and/or with lower coding rate.

In some embodiments, the second message is transmitted by the base station with a coding rate lower than conventional random access response messages (e.g., conventional RAR messages as defined in existing 3GPP standards).

In some embodiments, the method 900 may also include: transmitting a third message to the base station in response to successfully decoding the second message from the base station. The third message may be transmitted (a) with lower coding data rate than conventional PUSCH messages and/or (b) repeatedly in time.

Method for Operating a Base Station

In one set of embodiments, a method 1000 for operating a base station (BS) may be performed as illustrated in FIG. 10. (Method 1000 may also include any subset of the features, elements and embodiments described above.) The method 1000 may be performed to facilitate random access procedure for link-budget-limited UE devices. The method may be implemented by a processing agent of the base station, e.g., a processing agent as variously described above.

At 1010, the method may include transmitting first configuration information for one or more link-budget-limited user equipment (UE) devices. Each of the link-budget-limited UE devices may be configured to transmit a random access preamble and perform one or more retransmissions of the random access preamble. The random access preamble includes one or more instances of a Zadoff-Chu sequence. The first configuration information indicates a pattern of times (and/or other configuration features such as frequency hopping pattern) for said transmission and said one or more retransmissions of the random access preamble. In some embodiments, the random access preamble includes at least three instances of the Zadoff-Chu sequence.

In some embodiments, operation 1010 may be omitted. For example, the pattern of times (and/or other configuration features) may have been previously agreed upon by the base station and the one or more link-budget-limited UE devices (or a subset of those devices). Thus, transmission of the first configuration information is not needed.

At 1015, the method may include receiving said transmission of the random access preamble from a first of the one or more UE devices to obtain a first data record, i.e., a set of samples.

At 1020, the method may include receiving said one or more retransmissions of the random access preamble from the first UE device to obtain respectively one or more additional data records.

At 1025, the method may include decoding the random access preamble based on the first data record and the one or more additional data records.

In some embodiments, the method 1000 may also include transmitting second configuration information for one or more UE devices that are not link budget limited. Each of the UE devices that are not link budget limited may be configured to transmit a second random access preamble based on timing identified by the second configuration information. (The second random access preamble may conform to a conventional preamble format.) The second random access preamble transmitted by any given one of the non-link-budget-limited UE devices includes at most two instances of a Zadoff-Chu sequence selected by that UE device.

In some embodiments, the first configuration information and the second configuration information are determined by the base station so that a first set of time-frequency resources usable by the first UE device to perform said transmission and said one or more retransmissions of the random access preamble is different from a second set of time-frequency resources usable by the one or more UE devices that are not link budget limited to transmit the second random access preambles.

In some embodiments, the method 1000 may also include: in response to decoding the random access preamble, transmitting a random access response to the first UE device, wherein the random access response is transmitted (a) with lower coding rate than conventional random access responses and/or (b) using a plurality of repetitions in time.

In some embodiments, the method 1000 may also include: receiving a message from the first UE device, wherein the first UE device transmits the message after receiving the random access response, wherein the message is transmitted with coding rate lower than normal PUSCH messages and/or with a plurality of repetitions in time.

In some embodiments, the first configuration information identifies the pattern of times from a predetermined set of time patterns (known to the UE devices).

In some embodiments, the random access preamble includes a plurality of sub-carriers for conveying said at least three instances of the Zadoff-Chu sequence, wherein a spacing of the subcarriers is greater than 1.25 kHz.

In some embodiments, the random access preamble spans more than one transmission time interval/subframe (TTI).

User Equipment with Signaling of Doppler Category Via Sequence Set Selection

In one set of embodiments, a method 1100 for operating a user equipment (UE) device may be performed as illustrated in FIG. 11. (Method 1100 may also include any subset of the features, elements and embodiments described above.) The method 1100 may be performed to facilitate random access procedure for link-budget-limited UE devices. The method may be implemented by a processing agent. The processing agent may be realized by one or more processors executing program instructions, by one or more programmable hardware elements, by one or more dedicated hardware devices such as ASICs, or by any combination of the foregoing.

At 1110, the processing agent may select a set from a plurality of sets of Zadoff-Chu sequences. The selection may be based on a measurement of Doppler shift magnitude of the UE device relative to a base station. (In alternative embodiments, the selection may be based on some other property or data value or range of data values to be signaled to the base station.) The identity of the selected set among the plurality of sets is usable by a base station to determine a correlation accumulation method. Each set may include a plurality of Zadoff-Chu sequences.

The correlation accumulation method may, e.g., be selected from a complex-valued accumulation method and an energy accumulation method, e.g., as variously described above. The set of accumulation methods from which selection occurs may include other methods as well.

At 1115, the processing agent may perform two or more transmissions of a first message. The first message may include one or more instances of a particular Zadoff-Chu sequence chosen from the selected set.

In some embodiments, the two or more transmissions are performed with frequency hopping over a plurality of time intervals. Different ones of the above-described sets may be associated with different patterns of frequency hopping.

In some embodiments, the two or more transmissions are performed according to one of a plurality of possible repetition patterns in time. Different ones of the sets may be associated with different ones of the repetitions patterns in time.

In one set of embodiments, a method 1200 for operating a user equipment (UE) device may be performed as illustrated in FIG. 12. (Method 1200 may also include any subset of the features, elements and embodiments described above.) The method 1200 may be performed to facilitate a random access procedure for link-budget-limited UE devices. The method 1200 may be implemented by a processing agent. The processing agent may be realized by one or more processors executing program instructions, by one or more programmable hardware elements, by one or more dedicated hardware devices such as ASICs, or by any combination of the foregoing.

At 1210, the processing agent may select a set from a plurality of sets based on a measurement of Doppler shift magnitude of UE relative to a base station. Each of the sets includes a plurality of Zadoff-Chu sequences. Different ones of the sets have been assigned to different ranges of Doppler shift magnitude.

At 1215, the processing agent may perform two or more transmissions of a first message, where the first message includes one or more instances of a particular Zadoff-Chu sequence chosen from the selected set. The UE device thereby signals to the base station information regarding its measured Doppler shift magnitude. The base station may use the identity of the selected set to determine an appropriate method for correlation data combining over the two or more instances of the first message.

In some embodiments, the base station may be configured to: receive symbol data in response to the two or more transmissions of the first message; perform correlation processing on the symbol data to obtain information identifying the particular Zadoff-Chu sequence and information identifying the selected set among the plurality of sets; select a correlation accumulation method from a complex-valued accumulation method and an energy accumulation method based on the information identifying the selected set; and accumulate two or more correlation sequences according to the selected correlation accumulation method, wherein each of the two or more correlation sequences is generated by correlation of a respective portion of the symbol data with the particular Zadoff-Chu sequence, wherein each of the portions of the symbol data corresponds to a respective instance of the particular Zadoff-Chu sequence in one of the two or more transmissions.

In some embodiments, each of the two or more transmissions occurs in a different time interval, wherein a first of the transmissions in a first time interval occupies a first set of frequency resources, wherein a second of the transmissions in a second time interval occupies a second set of frequency resources different from the first set of frequency resources.

In some embodiments, the two or more transmissions respectively occupy two or more distinct time intervals, wherein frequency resources used to perform the two or more transmissions change from one the time intervals to the next according to a particular one of a plurality of frequency hopping patterns, wherein each of the plurality frequency hopping patterns is associated with a respective one of the plurality of sets.

In some embodiments, the base station is configured to: receive symbol data in response to the two or more transmissions of the first message; perform correlation processing on subsets of the symbol data, wherein each of the subsets of the symbol data corresponds to a respective one of the frequency hopping patterns, wherein the correlation processing determines information identifying the particular Zadoff-Chu sequence and information identifying the selected set among the plurality of sets of Zadoff-Chu sequences; and accumulate two or more correlation sequences generated by correlating two or more respective portions of a particular subset of the symbol data with the particular Zadoff-Chu sequence, wherein the particular subset of the symbol data is chosen based on the information identifying the selected set of Zadoff-Chu sequences, wherein each of the two or more portions of the particular subset corresponds to a respective instance of the particular Zadoff-Chu sequence in one of the two or more transmissions of the first message.

In some embodiments, the two or more transmissions are performed according to one of a plurality of repetition patterns in time, wherein each of the repetition patterns in time is associated with a respective one of the sets of Zadoff-Chu sequences.

In some embodiments, the base station is configured to: receive symbol data in response to the two or more transmissions of the first message; perform correlation processing on subsets of the symbol data, wherein each of the subsets corresponds to a respective one of the repetitions patterns in time, wherein the correlation processing determines information identifying the particular Zadoff-Chu sequence and information identifying the selected set among the plurality of sets of Zadoff-Chu sequences; and accumulate two or more correlation sequences to obtain an accumulated correlation sequence, wherein the two or more correlation sequences are generated by correlating two or more respective portions of a particular subset of the symbol data with the particular Zadoff-Chu sequence, wherein the particular subset of the symbol data is chosen based on the information identifying the selected set of Zadoff-Chu sequences, wherein each of the two or more respective portions corresponds to a respective instance of the particular Zadoff-Chu sequence in one of the two or more transmissions of the first message.

Figure 13:
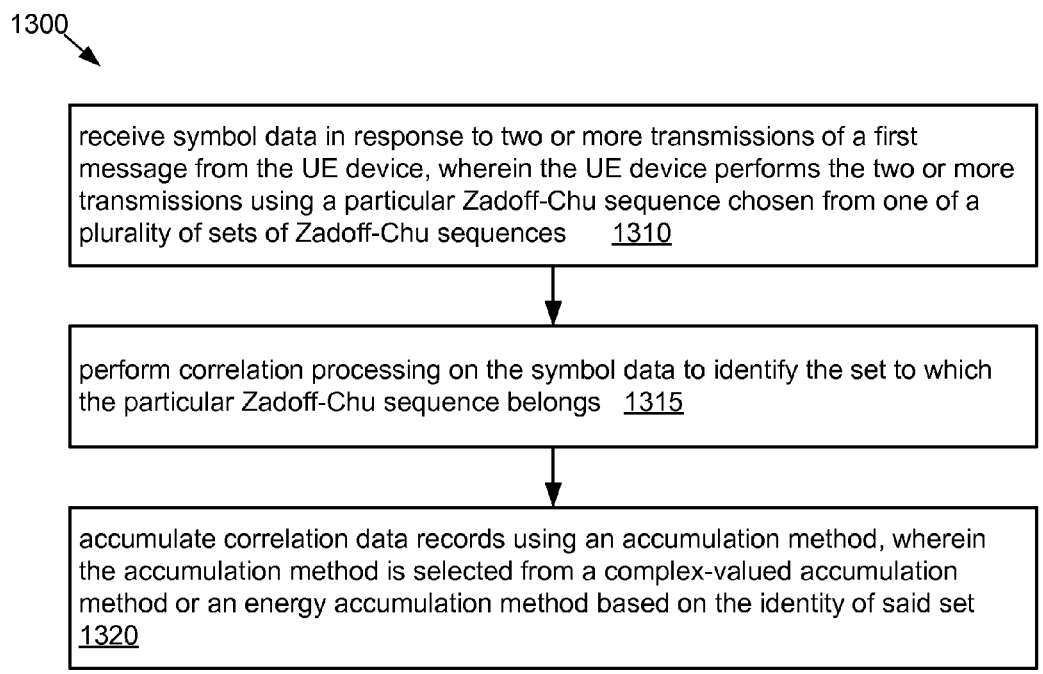

Base Station Selects Correlation Accumulation Method Based on Set Membership of Zadoff-Chu Sequence In one set of embodiments, a method 1300 for operating a base station may be performed as illustrated in FIG. 13. (Method 1300 may also include any subset of the features, elements and embodiments described above.) The method 1300 may be performed to facilitate random access procedure for link-budget-limited UE devices. The method 1300 may be implemented by a processing agent. The processing agent may be realized by one or more processors executing program instructions, by one or more programmable hardware elements, by one or more dedicated hardware devices such as ASICs, or by any combination of the foregoing.

At 1310, the processing agent may receive symbol data in response to two or more transmissions of a first message from the UE device, e.g., as variously described above. The UE device may perform the two or more transmissions using a particular Zadoff-Chu sequence chosen from one of a plurality of sets of Zadoff-Chu sequences.

At 1315, the processing agent may perform correlation processing on the symbol data to identify the set to which the particular Zadoff-Chu sequence belongs.

At 1320, the processing agent may accumulate correlation data records using an accumulation method. The accumulation method may be selected from a complex-valued accumulation method or an energy accumulation method based on the identity of said set.

In some embodiments, the UE device performs the two or more transmissions using frequency hopping over a plurality of time intervals, wherein different ones of the sets are associated with different patterns of frequency hopping. In these embodiments, the method may also include determining the frequency hopping pattern based on the identity of said set.

In some embodiments, the UE device performs the two or more transmissions according to one or a plurality of possible repetitions patterns in time, wherein different ones of the sets are associated with different repetition patterns in time. In these embodiments, the method may also include determining the repetition pattern based on the identity of said set.

In some embodiments, the correlation accumulation method is selected from a complex-valued accumulation method and an energy accumulation method.

In one set of embodiments, a method 1400 for operating a base station may be performed as illustrated in FIG. 14. (Method 1400 may also include any subset of the features, elements and embodiments described above.) The method 1400 may be performed to facilitate random access procedure for link-budget-limited UE devices. The method 1400 may be implemented by a processing agent. The processing agent may be realized by one or more processors executing program instructions, by one or more programmable hardware elements, by one or more dedicated hardware devices such as ASICs, or by any combination of the foregoing.

At 1410, the processing agent may receive symbol data in response to two or more transmissions of a first message from the UE device, wherein the first message includes one or more instances of a particular Zadoff-Chu sequence, wherein the particular Zadoff-Chu sequence has been chosen by the UE device from a selected one of a plurality of sets of Zadoff-Chu sequences, wherein each of the sets corresponds to a different range of magnitude of Doppler shift of the UE device relative to the base station At 1415, the processing agent may perform correlation processing on the symbol data to determine information identifying the particular Zadoff-Chu sequence and information identifying the selected set among the plurality of sets.

At 1420, the processing agent may select a correlation accumulation method from a complex-valued accumulation method and an energy accumulation method based on the information identifying the selected set.

At 1425, the processing agent may accumulate two or more correlation sequences according to the selected correlation accumulation method. Each of the two or more correlation sequences may be generated by correlation of a respective portion of the symbol data with the particular Zadoff-Chu sequence. Each of the portions of the symbol data may correspond to a respective instance of the particular Zadoff-Chu sequence in one of the two or more transmissions.

In some embodiments, each of the two or more transmissions occurs in a different time interval. A first of the transmissions in a first time interval may occupy a first set of frequency resources; and a second of the transmissions in a second time interval may occupy a second set of frequency resources different from the first set of frequency resources.

In some embodiments, the two or more transmissions respectively occupy two or more distinct time intervals, where frequency resources used to perform the two or more transmissions change from one the time intervals to the next according to a particular one of a plurality of frequency hopping patterns, wherein each of the plurality frequency hopping patterns is associated with a respective one of the plurality of sets.

In some embodiments, the method 1400 may also include: receiving symbol data in response to the two or more transmissions of the first message; performing correlation processing on subsets of the symbol data, wherein each of the subsets of the symbol data corresponds to a respective one of the frequency hopping patterns, wherein the correlation processing determines information identifying the particular Zadoff-Chu sequence and information identifying the selected set among the plurality of sets of Zadoff-Chu sequences; accumulating two or more correlation sequences generated by correlating two or more respective portions of a particular subset of the symbol data with the particular Zadoff-Chu sequence, wherein the particular subset of the symbol data is chosen based on the information identifying the selected set of Zadoff-Chu sequences, wherein each of the two or more portions of the particular subset corresponds to a respective instance of the particular Zadoff-Chu sequence in one of the two or more transmissions of the first message.

In some embodiments, the two or more transmissions are performed according to one of a plurality of repetition patterns in time, wherein each of the repetition patterns in time is associated with a respective one of the sets of Zadoff-Chu sequences.

In some embodiments, the method 1400 may also include: receiving symbol data in response to the two or more transmissions of the first message; performing correlation processing on subsets of the symbol data, wherein each of the subsets corresponds to a respective one of the repetitions patterns in time, wherein the correlation processing determines information identifying the particular Zadoff-Chu sequence and information identifying the selected set among the plurality of sets of Zadoff-Chu sequences; and accumulating two or more correlation sequences to obtain an accumulated correlation sequence, wherein the two or more correlation sequences are generated by correlating two or more respective portions of a particular subset of the symbol data with the particular Zadoff-Chu sequence, wherein the particular subset of the symbol data is chosen based on the information identifying the selected set of Zadoff-Chu sequences, wherein each of the two or more respective portions corresponds to a respective instance of the particular Zadoff-Chu sequence in one of the two or more transmissions of the first message.

In some embodiments, the first message includes two instances of the particular Zadoff-Chu sequence.

Example of Frequency Hopping Over Multiple PRACH Transmissions

Figure 15:
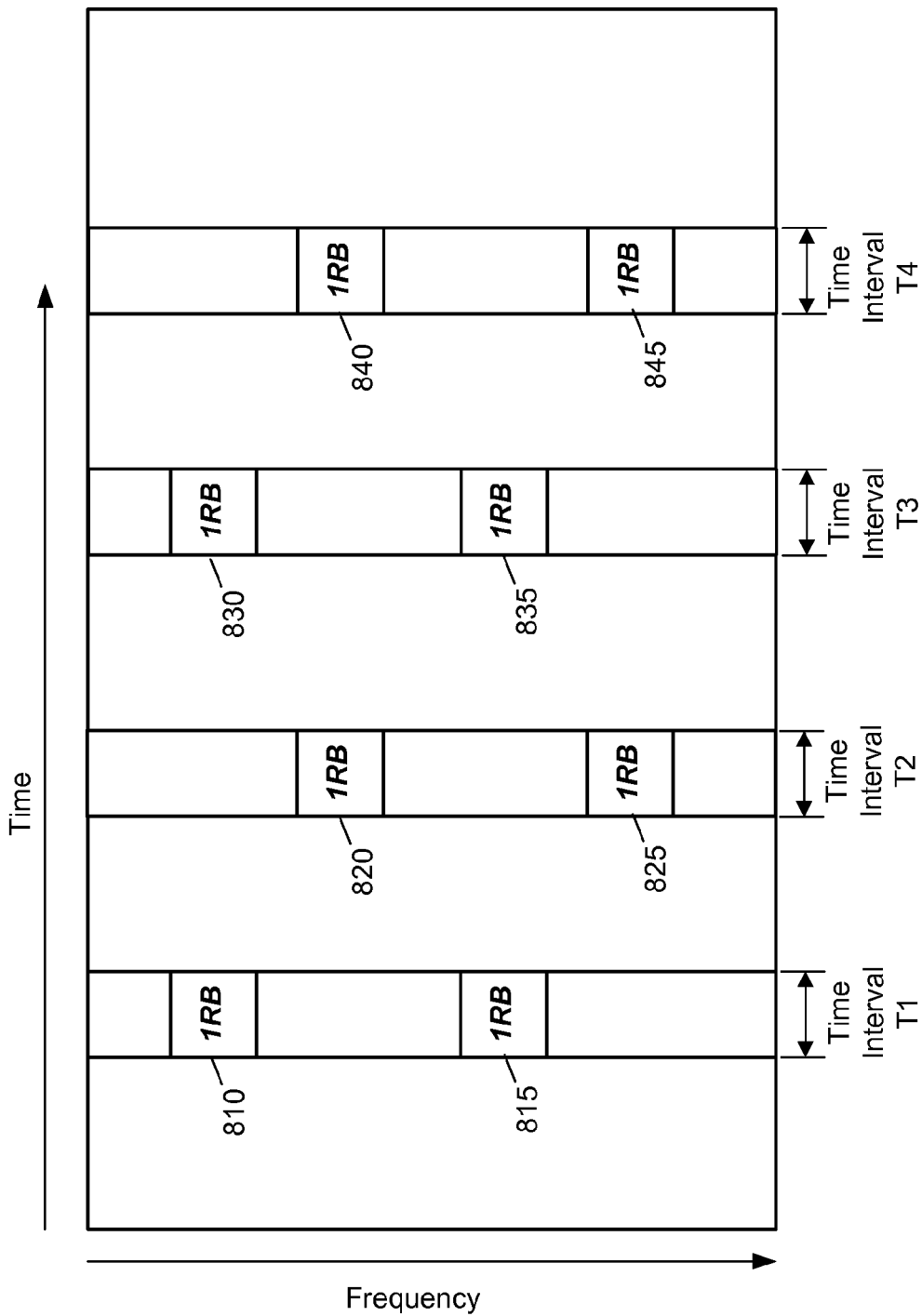
FIG. 15 illustrates a simple example of frequency hopping over multiple PRACH transmissions, according to one embodiment.

FIG. 15 illustrates a simple example of frequency hopping over multiple PRACH transmissions. Each PRACH transmission includes 2 RBs and occurs in a corresponding time interval. For example, a first PRACH transmission includes RBs 810 and 815, which occur in time interval T1; a second PRACH transmission includes RBs 820 and 825, which occur in time interval T2; a third PRACH transmission includes RBs 830 and 835, which occur in time interval T3; and a fourth PRACH transmission includes RBs 840 and 845, which occur in time interval T4. The pair of RBs hops to different frequency locations in different time intervals, thus providing frequency diversity. A wide variety of other possibilities for the frequency hopping pattern and the various transmission parameters are contemplated, and the present example is not meant to be limiting.

PRACH Repetition Over Consecutive Subframes for Link-Budget-Limited UE Devices

In some embodiments, a link-budget-limited UE device may transmit the PRACH repeatedly, over successive subframes, e.g., with one PRACH transmission in each of the successive subframes. Thus, it may not be necessary to modify the SIB2 information. The subframe where the first instance of the PRACH is sent may be the subframe indicated by the SIB2 as defined by existing LTE standards. (UE devices operating under the existing LTE standards would transmit only one PRACH-containing subframe.) UE devices that are not link budget limited (e.g., UE devices that are closer to the eNB) may perform random access in a conventional manner, using only one PRACH-containing subframe.

In any one of the successive subframes, the 2 RBs forming the PRACH for that subframe can be adjacent or spread across the frequency domain (e.g., at the edges of 1.4 MHz, 5 MHz or 10 MHz) to benefit from frequency diversity. In one embodiment, new PRACH format C may be used for transmitting the instances of the PRACH in the corresponding subframes. However, any of a wide variety of other formats may be used.

The number of repetitions of the PRACH may be fixed. Alternatively, the number of repetitions may be variable, e.g., signaled to the UE by the eNB. For example, a value may be added in SIB2, in order to signal the number of repetitions.

While the PRACH is repeated in the time domain, the location of the 2 RBs forming the PRACH can hop in the frequency domain from one subframe to the next, allowing the eNB to benefit from frequency diversity. The hopping pattern could either be predetermined (fixed), or signaled in system information (e.g., SIB2) transmitted by the eNB.

In some embodiments, the RBs used by a link-budget-limited UE device for its first PRACH transmission at least partially overlap with the RBs used by a normal UE device for its only PRACH transmission. (The term "normal UE device" is a synonym for a UE device that is not link budget limited.) However, the link-budget-limited UE devices and normal UE devices will use different ZC sequences, e.g., randomly chosen ZC sequences. Thus, even though link-budget-limited devices and normal devices collide on the commonly used RBs, the ZC sequences may be sufficiently orthogonal that the eNB can clearly detect the ZC sequence transmitted by each of the devices. Link-budget-limited devices will have additional opportunities to re-transmit PRACH in the following consecutive subframes.

In other embodiments, the RBs used by a link-budget-limited UE device for its first PRACH transmission are configured to be disjoint with the RBs used by a normal UE device for its only PRACH transmission.

FIG. 16—PRACH Instances Transmitted Over Consecutive Subframes

In one set of embodiments, a method 1600 for operating a UE device may include the operations shown in FIG. 16. (The method 1600 may also include any subset of the features, elements and embodiments described above.) The method 1600 may be employed to facilitate a random access procedure when the UE device is link budget limited. The operations may be performed by a processing agent of the UE device, e.g., a processing agent as variously described above.

At 1610, the UE device may transmit a plurality of instances of a Physical Random Access Channel (PRACH) over a plurality of consecutive subframes of an uplink signal to a base station. Each of the consecutive subframes may include a corresponding one of the PRACH instances. (The plurality of PRACH instances are preferably transmitted as part of a single random access attempt by the UE device.) The consecutive subframes may be subframes in a single radio frame or in a plurality of radio frames.

In some embodiments, resource blocks used by the UE device to transmit a first of the PRACH instances in a first of the consecutive subframes are disjoint from resource blocks used by a second UE device to transmit a conventional PRACH subframe, where the second UE device is not link budget limited.

In some embodiments, resource blocks used by the link-budget-limited UE device to transmit a first of the PRACH instances in a first of the consecutive subframes at least partially overlap with resource blocks used by a second UE device to transmit a conventional PRACH subframe, where the second UE device is not link budget limited. The link-budget-limited UE device and the second UE device may each be configured to randomly select a corresponding ZC root for PRACH transmission. (Thus, the independently selected ZC roots are likely to be sufficiently orthogonal for unique identification at the base station.)

In some embodiments, the method 1600 may also include receiving system information (e.g., as part of SIB2) that indicates the number of said consecutive subframes.

In some embodiments, the number of said successive subframes is fixed, and known by the link budget limited UE device and the base station.

In some embodiments, resource blocks used by the link-budget-limited UE device to transmit a PRACH instance hop in the frequency domain from one of the consecutive subframes to the next.

In some embodiments, a hopping pattern according to which the resource blocks hop in the frequency domain is fixed and known by the link-budget-limited UE device and the base station.

In some embodiments, the method 1600 may also include receiving system information (e.g., as part of SIB2) identifying a hopping pattern to be used to perform said hopping in the frequency domain.

FIG. 17—Base Station Supporting Correlation Accumulation of PRACH Instances

In one set of embodiments, a method 1700 for operating a base station may include the operations shown in FIG. 17. (The method 1700 may also include any subset of the features, elements and embodiments described above.) The method 1700 may be employed to facilitate successful completion of a random access procedure when a UE device is link budget limited. The operations may be performed by a processing agent of the base station, e.g., a processing agent as variously described above.

At 1710, the base station may receive symbol data in response to a transmission of a plurality of instances of a PRACH by the UE device. The plurality of PRACH instances are transmitted over a plurality of consecutive subframes. (The plurality of PRACH instances are transmitted as part of a single random access attempt by the UE device.) Each of the plurality of consecutive subframes contains a corresponding one of the PRACH instances.

At 1715, the base station may perform correlation processing on the symbol data to determine which Zadoff-Chu (ZC) sequence from a set of available ZC sequences is included in the plurality of PRACH instances. The correlation processing accumulates correlation data over the plurality of consecutive subframes. The accumulation of the correlation data may have the effect of improving the probability of successful decode of the PRACH preamble.

Time Repetition of the New PRACH Format

In order for the eNB to accumulate the repeated PRACH transmissions over the consecutive subframes, the eNB needs to know the number of the consecutive subframes used by the UE to transmit the repeated PRACH transmissions. This number could be fixed (e.g., 2 or 3 or 4 or 5), or signaled by the eNB in system information (e.g., in a modified version of SIB2).

The eNB may need to know the frequency hopping pattern of the RBs (e.g., 2 RBs) containing the PRACH sequence, i.e., the pattern of frequency hopping from one subframe to the next in the set of successive subframes. Similar to the above, the hopping pattern could either be fixed (e.g., a hopping sequence for each ZC root sequence chosen by the UE) or signaled in system information such as SIB2.

Signaling Link-Budget-Limited Status by Additional PRACH Transmissions

In some embodiments, an eNB and UE devices may operate as follows to allow the eNB to determine during the initial PRACH messaging of the random access procedure whether a given UE device is link budget limited or not.

The eNB may transmit conventional system information (such as SIB2) to the UE device in the cell (or sector), wherein the system information controls features of the random access procedure such as PRACH configuration and PRACH format. For example, the eNB may signal in SIB2 one of PRACH format 0 or PRACH format 2, as defined by the LTE specifications. When initiating the random access procedure, any UE device, whether link budget limited or not, may transmit a conventional set of one or two consecutive PRACH-containing subframes, using the PRACH format and the PRACH configuration signaled by the eNB, as defined by the LTE specifications. (Format 0 uses only one PRACH-containing subframe. Format 2 uses two consecutive PRACH-containing subframes.) A link budget limited device will continue by transmitting one or more additional PRACH-containing subframes that follow consecutively after the conventional subframe set. A UE device that is not link budget limited will not transmit any additional PRACH-containing subframe as part of the present random access procedure. (Any UE device may initiate a new random access procedure if the present procedure fails.) The number of the one or more additional PRACH-containing subframes used by link budget limited devices is known by the eNB.

In other words, any UE device may transmit the one or more PRACH attempts as dictated by the existing LTE standards while the link budget limited UE device will transmit one or more additional PRACH subframes in each attempt, in order to signal its link budget limited status to the eNB. The one or more additional PRACH instances occur in consecutive subframes and start in the subframe immediately after the last subframe of the conventional subframe set.

The eNB can determine whether a UE device is link budget limited or not by analyzing the conventional subframe set, and the entire subframe set, which includes the conventional subframe set and the one or more additional subframes. If a UE device is link budget limited, correlation processing on the entire subframe set should identify a significant peak (or strong peak) for the UE-selected ZC sequence. If a UE device is not link budget limited, correlation processing of the conventional subframe set should identify a peak for the UE-selected ZC sequence, while correlation processing on the entire subframe set may fail to identify a unique peak due to the diluting (correlation destroying) effect of the non-PRACH-bearing additional subframes.

As an example, if the eNB signals the use of format 0 and subframe 0, the link budget limited UE device may send a first PRACH instance (as dictated by format 0) in subframe 0, and an additional PRACH instance in each of subframes 1 and 2. Each additional PRACH instance may use the same ZC sequence, the same number or PRACH-containing resource blocks as the first PRACH instance.

As another example, if the eNB signals the use of format 2 and subframe 0, then the link budget limited UE device may send a PRACH instance in each of subframes 0 and 1, as dictated by format 2, and then transmit an additional PRACH instance in each of subframes 2 and 3. Each additional PRACH instance may use the same PRACH configuration as subframes 0 and 1.

In alternative embodiments, a link budget limited UE device may ignore the PRACH format signaled by SIB2, and always use a predetermined one of format 0 or format 2 for its initial PRACH messaging, but otherwise behave as described above in the section "Signaling Link-Budget-Limited Status by Additional PRACH Transmissions". (The predetermined format is known to the eNB, and thus, the eNB knows to receive PRACH instances according to the predetermined format.)

For example, whenever it needs to perform the random access procedure, a link budget limited UE may send format 2 in subframes 0 and 1 (format 2 lasts 2 ms), and repeats in subframes 2 and 3. As another example, whenever it needs to perform the random access procedure, a link budget limited UE may send format 0 in subframe 0, and repeats in subframe 1 and subframe 2.

FIG. 18—Method for Signaling Link Budget Limited Status to Base Station

In one set of embodiments, a method 1800 for operating a user equipment (UE) device may include the operations shown in FIG. 18. (The method 1800 may also include any subset of the features, elements and embodiments described above.) The method 1800 may be employed to facilitate successful completion of a random access procedure if (or when) a UE device is link budget limited. The operations may be performed by a processing agent of the UE device, e.g., a processing agent as variously described above.

At 1810, the UE device may transmit a first set of one or more instances of a Physical Random Access Channel (PRACH) respectively over a first set of one or more consecutive subframes. The action of transmitting the first set of one or more PRACH instances may be performed according to a conventional format for transmission of PRACH.

At 1815, the UE device may transmit a second set of one or more instances of the PRACH respectively over a second set of one or more consecutive subframes starting immediately after a last subframe of the first set of one or more subframes. Each of the one or more PRACH instances of the first set and each of the one or more PRACH instances of the second set may use the same Zadoff-Chu sequence.

Operations 1810 and 1815 are performed as part of a single random access attempt by the link-budget-limited UE device.

UE devices that are not link budget limited may be configured to transmit the one or more conventional instances of the PRACH but not the one or more additional instances. Thus, the base station is able to determine whether a given UE device attempting random access is link budget limited or not by determining whether the additional instances are present in the uplink signal.

In some embodiments, the method 1800 may also include, prior to said transmitting the first set of one or more PRACH instances, receiving system information (e.g., in SIB2) from a base station. The system information may indicate at least the conventional format. (The "conventional format" may, e.g., be a format specified by 3GPP TS 36.211.)

In some embodiments, the conventional format may be a fixed format known to a base station serving the UE device.

In some embodiments, the conventional format corresponds to PRACH format 0 of 3GPP TS 36.211, wherein the first set of one or more subframes includes only one subframe.

In some embodiments, the conventional format corresponds to PRACH format 2 of 3GPP TS 36.211, where the first set of one or more subframes includes exactly two subframes.

In some embodiments, a PRACH configuration (e.g., number of PRACH-containing resource blocks, number of ZC sequence repetitions, ZC sequence length) for each subframe of the first set and for each subframe of the second set is identical.

In one set of embodiments, a method 1900 for operating a user equipment (UE) device may include the operations shown in FIG. 19. (The method 1900 may also include any subset of the features, elements and embodiments described above.) The method 1900 may be employed to facilitate successful completion of a random access procedure if (or when) a UE device is link budget limited. The operations may be performed by a processing agent of the UE device, e.g., a processing agent as variously described above.

At 1910, the UE device may transmit a first set of one or more consecutive subframes including a first Physical Random Access Channel (PRACH). The first PRACH may be transmitted according to a conventional format for PRACH transmission.

At 1915, the UE device may transmit a second set of one or more consecutive subframes containing one or more repetitions of the first PRACH. The second set of one or more consecutive subframes may start immediately after a last subframe of the first set of one or more subframes. Each of the one or more PRACH repetitions may use the same Zadoff-Chu sequence as the first PRACH.

Operations 1910 and 1915 are performed as part of a single random access attempt by the link-budget-limited UE device.

In one set of embodiments, a method 2000 for operating a base station may include the operations shown in FIG. 20. (The method 2000 may also include any subset of the features, elements and embodiments described above.) The method 2000 may be employed to facilitate successful completion of a random access procedure if (or when) a UE device is link budget limited. The operations may be performed by a processing agent of the base station, e.g., a processing agent as variously described above.

At 2010, the base station may receive a first symbol data set in response to a first transmission by the UE device, wherein the first transmission includes a first set of one or more instances of a Physical Random Access Channel (PRACH) respectively over a first set of one or more consecutive subframes, wherein said first transmission is performed according to a conventional format for transmission of PRACH.

At 2015, the base station may receive a second symbol data set in response to a subsequent transmission by the UE device, wherein the subsequent transmission includes a second set of one or more consecutive subframes starting immediately after a last subframe of the first set of one or more subframes.

At 2020, the base station may perform correlation processing on a union of the first symbol data set and the second symbol data set to determine if the second set of one or more consecutive subframes contains one or more PRACH instances in addition to the first set of one or more PRACH instances, wherein the one or more additional PRACH instances, if present, are assumed to use to the same ZC sequence as the one or more PRACH instances of the first set.

At 2025, in response to determining that the second set of one or more consecutive subframes contains one or more PRACH instances in addition to the first set of one or more PRACH instances, the base station may store in memory an indication that the UE device is link budget limited.

In some embodiments, the method 2000 may also include, prior to said receiving the first symbol data set, transmitting system information that indicates at least the conventional format.

In some embodiments, the conventional format is a fixed format known to the base station.

In some embodiments, the method 2000 may also include: in response to the indication that the UE device is link budget limited, transmitting one or more messages of a random access procedure to the UE device using a lower coding rate (or more redundancy) than used when non-link-budget limited UE devices are attempting random access.

In some embodiments, the method 2000 may also include: in response to the indication that the UE device is link budget limited, transmitting downlink payload data to the UE device using a lower coding rate (or more redundancy) than used when non-link-budget limited UE devices are attempting random access.

The stored indication of link-budget-limited status of a UE device may be used by the base station to invoke special handling procedures for that UE device, e.g., for transmission of MSG2 and/or MSG4, and/or, for reception of MSG3 of the random access procedure, e.g., as variously described above.

In one set of embodiments, a method 2100 for operating a base station may include the operations shown in FIG. 21. (The method 2100 may also include any subset of the features, elements and embodiments described above.) The method 2100 may be employed to facilitate successful completion of a random access procedure if (or when) a UE device is link budget limited. The operations may be performed by a processing agent of the base station, e.g., a processing agent as variously described above.

At 2110, the base station may receive a first symbol data set in response to a first transmission by the UE device, wherein the first transmission is a transmission of a first set of one or more consecutive subframes including a first Physical Random Access Channel (PRACH), wherein said first PRACH is transmitted according to a conventional format for PRACH transmission.

At 2115, the base station may receive a second symbol data set in response to a subsequent transmission by the UE device, wherein the subsequent transmission is a transmission of a second set of one or more consecutive subframes, wherein the second set of one or more consecutive subframes starts immediately after a last subframe of the first set of one or more subframes.

At 2120, the base station may perform correlation processing on a union of the first symbol data set and the second symbol data set to determine if the second set of one or more consecutive subframes contains one or more repetitions of the first PRACH, wherein the one or more repetitions of the first PRACH, if present, are assumed to use to the same Zadoff-Chu sequence as the first PRACH.

At 2125, in response to determining that the second set of one or more consecutive subframes contains one or more repetitions of the first PRACH, the base station may store in memory an indication that the UE device is link budget limited.

Background Regarding Conventional PRACH Sequence Set

In 3GPP TS 36.211, a list of logical root sequence numbers and corresponding physical root sequence numbers is specified for PRACH. See FIG. 22, which shows Table 5.7.2-4 of TS 36.211. The eNB will signal a logical root sequence number in SIB2. The UE then will generate a set of 64 Zadoff-Chu sequences based: on Ncs (also signaled in SIB2); and physical root sequence numbers corresponding respectively to consecutive logical root sequence numbers, starting with the signaled logical root sequence number. In particular, the eNB generates a first subset of the sequences based on cyclic shifts using the first physical root sequence number until the first physical root sequence number is exhausted, then generates a second subset of sequences based on cyclic shifts using the second physical root sequence number until the second physical root sequence number is exhausted, and so on, until 64 sequences have been generated.

FIG. 23 is a copy of Table 5.7.2-2 ("Ncs for preamble generation, preamble formats 0-3") from 3GPP TS 36.211.

The Table shows the value of Ncs for restricted set and unrestricted set, as a function of zeroCorrelationZoneConfig.

Also the eNB will signal the PRACH configuration to the UE. The PRACH configuration will determine which subframes can be used by the UE to send the PRACH preamble. See FIG. 24, which presents a table showing frame structure type 1 random access configuration for preamble formats 0-3. For each subframe, the table shows the subframes allowed for PRACH preamble transmission.

Proposal to Identify Link-Budget-Limited UE Devices

In one set of embodiments, we propose to have one or more (e.g., one or two or three) reserved logical root sequence numbers for the link-budget-limited devices. The one or more physical root sequence numbers corresponding to the one or more reserved logical root sequence numbers are used to generate a special set of Zadoff-Chu sequences, from which a link-budget-limited UE device will randomly select. The special set may be disjoint from the conventional set of Zadoff-Chu sequences used by conventional UE devices. (UE devices that are not link budget limited may perform PRACH preamble transmission in a conventional fashion, by selecting from the conventional set.) The number of ZC sequences in the special set may be large enough to satisfy the needs of the expected number (or the expected maximum number or a specified maximum number) of link-budget-limited UE devices within the cell.

In some embodiments, the number of sequences reserved for the link-budget-limited devices may be approximately 12. However, a wide variety of other values or ranges of values are contemplated.

In some embodiments, only a single logical root sequence number is reserved.

In some embodiments, the value of Ncs is selected to be small. This feature may enable the UE to generate the special set of ZC sequences by cyclic shifts using only a single physical root sequence number. (The number of values of shift parameter $C_v$ is determined by floor($N_{ZC}/N_{CS}$), as specified in section 5.7.2 of TS 36.211.)

To support the link-budget-limited devices, a small (or smaller) value of Ncs may be used. (The value Ncs is also referred to herein as "cyclic shift value"). The small value increases the number of cyclic shifts that can be applied for a given physical root sequence number.

Now the presence of one of the sequences of the special set will constitute a particular signature for eNBs to recognize link-budget-limited devices.

In one set of embodiments, a method 2500 for operating a user equipment (UE) device may include the operations shown in FIG. 25. (The method 2500 may also include any subset of the features, elements and embodiments described above.) The method 2500 may be employed to facilitate successful completion of a random access procedure if (or when) the UE device is link budget limited. The operations may be performed by a processing agent of the UE device, e.g., a processing agent as variously described above.

At 2510, the UE device may receive system information including a configuration index for Physical Random Access Channel (PRACH), a cyclic shift value (Ncs) and a logical root number.

At 2520, if the first UE device is link budget limited, the UE device may perform a set of operations including operations 2525-2540, as described below.

At 2525, the UE device may compute a first physical root number based on the logical root number. The first physical root number may be different from a conventional physical root number corresponding to the logical root number.

At 2530, the UE device may generate a first set of Zadoff-Chu sequences based on the cyclic shift value and one or more physical root numbers including the first physical root number.

At 2535, the UE device may randomly select one of the Zadoff-Chu sequences of the first set. Methods of making a random selection from a set of objects are well known in the art of signal processing and applied mathematics.

At 2540, the UE device may transmit a first PRACH subframe that includes repetitions of the selected Zadoff-Chu sequence. The first PRACH subframe is transmitted during a first radio frame.

In some embodiments, the first physical root number is a member of a reserved set of physical root numbers that has been reserved for use only by UE devices that are link budget limited.

In some embodiments, the first physical root number is determined based on a predefined mapping of logical root number to physical root number. The mapping may be agreed upon by the UE device and a base station.

In some embodiments, the first physical root number is computed from the logical root number using a fixed formula that is known by base stations of a wireless network to which the UE device is subscribed.

In some embodiments, the number of Zadoff-Chu sequences in said first set is:
less than or equal to 32; or
less than or equal to 24; or
less than or equal to 16; or
in the range [9,16]; or
in the range [10,14].

In some embodiments, the above-described set of operations also includes the action of selecting the first radio frame so that its radio frame number is a multiple of a fixed integer greater than one, wherein the first integer is known to base stations of a wireless network to which to the first UE device is subscribed.

In some embodiments, the above-described set of operations also includes transmitting one or more additional PRACH subframes, wherein each of the one or more additional PRACH subframes includes repetitions of the selected Zadoff-Chu sequence, wherein each of the one or more additional PRACH subframes occupies a conventionally-allowed subframe of the first radio frame or a conventionally-allowed subframe of a second radio frame immediately following the first radio frame, wherein the conventionally-allowed subframes are subframes conventionally allowed based on the PRACH configuration index as defined in TS 36.211.

In some embodiments, the first set of Zadoff-Chu sequences is disjoint from the conventional set of 64 Zadoff-Chu sequences as defined by TS 36.211 based on the logical sequence number and the cyclic shift value.

Figure 26:
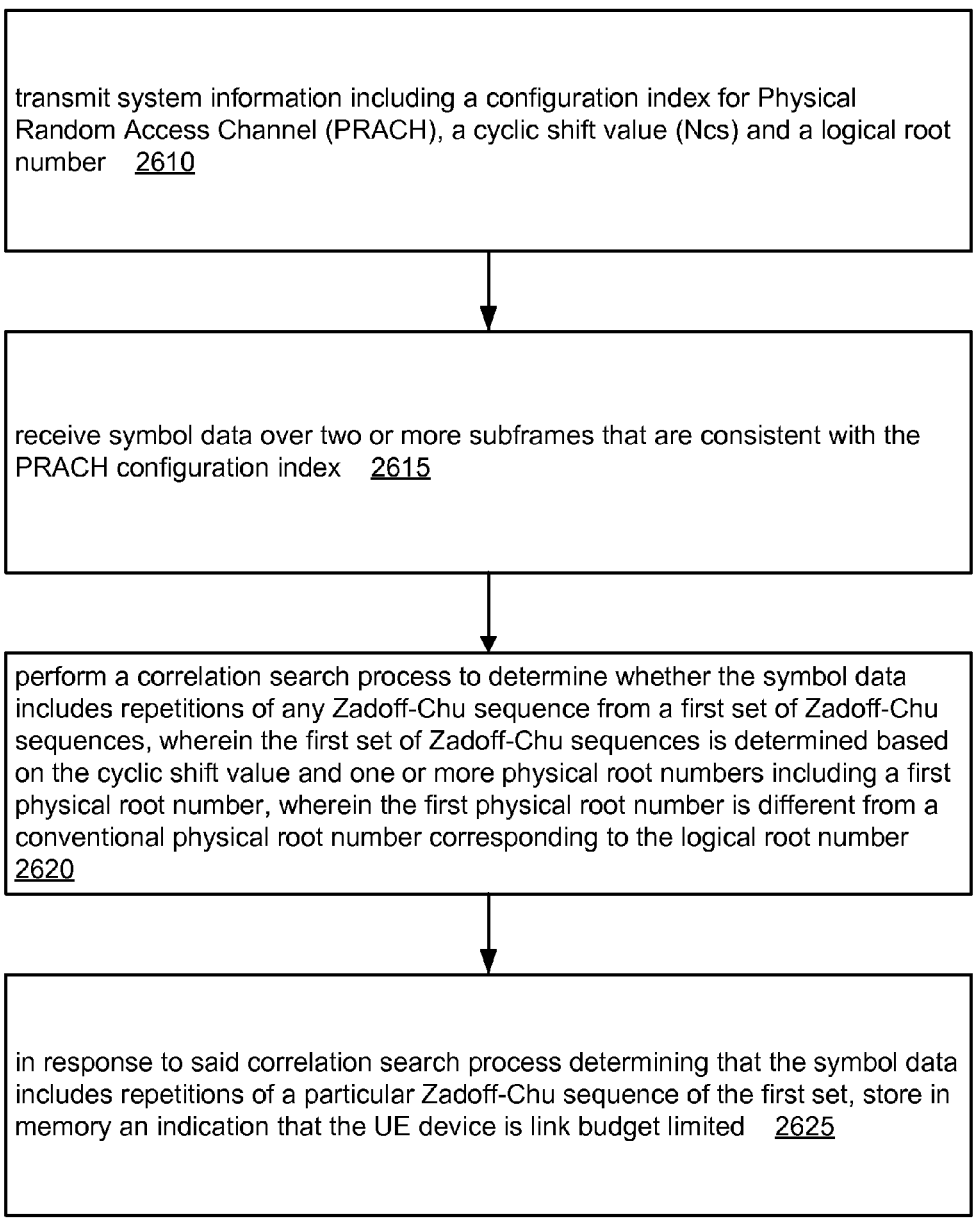
FIG. 26 illustrates one embodiment of a method for a base station to determine if a given UE device attempting random access is link budget limited or not by determining whether the PRACH preamble transmitted by the UE device uses a ZC sequence selected from a special set of ZC sequences or from a conventional set of ZC sequences.

In one set of embodiments, a method 2600 for operating a base station may include the operations shown in FIG. 26. (The method 2600 may also include any subset of the features, elements and embodiments described above.) The method 2600 may be performed to facilitate a random access procedure by a user equipment (UE) device that is link budget limited. The operations may be performed by a processing agent of the base station, e.g., a processing agent as variously described above.

At 2610, the base station may transmit system information including a configuration index for Physical Random Access Channel (PRACH), a cyclic shift value (Ncs) and a logical root number.

At 2615, the base station may receive symbol data over two or more subframes that are consistent with the PRACH configuration index.

At 2620, the base station may perform a correlation search process to determine whether the symbol data includes repetitions of any Zadoff-Chu sequence from a first set of Zadoff-Chu sequences. The first set of Zadoff-Chu sequences may be determined based on the cyclic shift value and one or more physical root numbers including a first physical root number, where the first physical root number is different from a conventional physical root number corresponding to the logical root number.

At 2625, in response to the correlation search process determining that the symbol data includes repetitions of a particular Zadoff-Chu sequence of the first set, the base station may store in memory an indication that the UE device is link budget limited.

In some embodiments, the two or more subframes occur in one or more consecutive radio frames.

In some embodiments, the first physical root number is a member of a reserved set of physical root numbers that has been reserved for use only by UE devices that are link budget limited. In some embodiments, the above-described one or more physical root numbers (of operation 2620) are members of a reserved set that has been reserved for use only by link-budget-limited UE devices.

In some embodiments, the first physical root number is determined based on a predefined mapping of logical root number to physical root number, wherein the mapping is agreed between UE device and the base station.

In some embodiments, the number of Zadoff-Chu sequences in said first set is:
  less than or equal to 32; or
  less than or equal to 24; or
  less than or equal to 16; or
  in the range [9,16]; or
  in the range [10,14].

In some embodiments, the above-described action of receiving symbol data starts in first radio frame whose frame number is a multiple of a fixed integer greater than one, wherein UE devices that are link budget limited are configured to start transmitting PRACH information only in radio frames whose frame number is a multiple of the fixed integer.

In some embodiments, the first set of Zadoff-Chu sequences is disjoint from the conventional set of 64 Zadoff-Chu sequences as defined by TS 36.211 based on the logical sequence number and the cyclic shift value.

In some embodiments, the method 2600 may also include: in response to the indication that the UE device is link budget limited, transmitting one or more messages of a random access procedure to the UE device using a lower coding rate (or increased redundancy) than used for non-link-budget limited UE devices.

In some embodiments, the method 2600 may also include: in response to the indication that the UE device is link budget limited, transmitting downlink payload data to the UE device using a lower coding rate (or increased redundancy) than used for non-link-budget-limited UE devices.

In some embodiments, the link-budget-limited UEs use a reserved set of ZC sequences while UE devices that are not link budget limited use a conventional set of ZC sequences for initiating random access (RACH), where the reserved set and the conventional set are disjoint. Thus, the base station can determine whether a given RACH-initiating UE is link budget limited or not by determining the set membership of the particular ZC sequence contained in the PRACH preamble transmitted by the given UE. In one embodiment, the base station may be designed (or directed) to transmit a PRACH configuration with HighSpeed flag set to FALSE. (The base station transmits the PRACH configuration to UE devices in the cell.) Thus, legacy UE devices and non-link-budget-limited UE devices may initiate random access (RACH) using the conventional set of sequences associated with HighSpeed flag=FALSE. (According to the 3GPP specifications, the conventional set of sequences associated with HighSpeed flag=FALSE is generated using: cyclic shifts $C_v$ corresponding to the so-called "unrestricted sets", and the one or more physical root sequence numbers specified for the case of unrestricted sets. However, the link-budget limited UE devices may be configured to disregard the False state of the HighSpeed flag, and initiate random access using the high speed sequences, i.e., the sequences conventionally associated with HighSpeed flag=TRUE. (According to the 3GPP specifications, the high speed sequences are generated using: cyclic shifts $C_v$ corresponding to the so-called "restricted sets", and the one more physical root sequence numbers specified for the case of restricted sets.) In particular, a given link-budget-limited UE may signal its link budget limited status to the base station by selecting one of the high speed sequences and initiating the random access procedure using the selected sequence. (One or more copies of the selected sequence may be embedded in the PRACH preamble transmitted by the link-budget-limited UE.) This use of a reserved set as a mechanism to signal link-budget-limited status is agreed upon with the network (NW).

The following is an example of a PRACH configuration that may be used by the NW:

```
prach-ConfigInfo
{
    prach-ConfigIndex 5,
    highSpeedFlag FALSE,
    zeroCorrelationZoneConfig 12,
    prach-FreqOffset 4
}
```

(Note that highSpeedFlag is off.) A wide variety of other configurations may be used as well.

Proposal to Improve Range

In some embodiments, the UE may repeat the same selected ZC sequence in one or more consecutive radio frames, and, within each of those radio frames, over all the allowed subframes based on the PRACH configuration.

For example, suppose the eNB is signaling PRACH configuration 7. This implies (as shown in FIG. 24) that any device in the network can send a PRACH preamble on subframe 2 or subframe 7 of any radio frame.

Suppose that a link-budget-limited device needs to send four PRACH subframes for adequate detectability by the eNB. Under PRACH configuration 7, this means that two radios frames will be required for the link-budget-limited device to send its PRACH preamble, i.e., the first two PRACH subframes will be transmitted respectively in subframes 2 and 7 of a first radio frame, and the last two PRACH subframes will be transmitted respectively in subframes 2 and 7 of a second radio frame immediately following the first radio frame.

In order to decode and accumulate the PRACH, the eNB needs to know where the PRACH repetition has started.

In some embodiments, in order to simplify the scheme and not make any change to the SIB2, the link-budget-limited device is constrained to start, e.g., only on subframe 2 of an even (or odd) radio frame, or more generally, only on the first allowed subframe consistent with the signaled PRACH configuration.

In some embodiments, the link-budget-limited device may start in an even radio frame (for example, radio frame 12) and then finish in the next radio frame (radio frame 13). There is no ambiguity in that case for the eNB to decode the PRACH transmitted by the link-budget-limited device.

In order to also reduce the processing load on eNB receiver, one proposal would be to make the link-budget-limited device send (and start) its first PRACH subframe only if the radio frame number modulo 4 equals 0.

This limits impact on system capacity and load on eNB, but comes at a cost of latency for the UE.

Repetition in Single Radio Frame

In some embodiments, the link-budget-limited UE device may transmit the PRACH preamble and one or more temporal repetitions of the PRACH preamble in a single radio frame. The initial transmission of the PRACH preamble and the one or more temporal repetitions may occur in consecutive available subframes of the single radio frame. For example, in PRACH configuration 7, recall that the available subframes are 2 and 7. Thus, to allow room for the repetition within a single radio frame, the initial transmission of the PRACH preamble may occur in the first available subframe, i.e., in subframe 2 of the radio frame, and a single retransmission of the PRACH preamble may occur in subframe 7 of the radio frame. Thus, the base station may perform accumulation of PRACH transmissions using the single subframe.

I. Robust PRACH Messaging Format for Link Budget Limited UE Devices

In one set of embodiments, a method for operating a user equipment (UE) device to facilitate a random access procedure may include transmitting a first message including at least three instances of a Zadoff-Chu sequence, wherein the first message is transmitted on a physical random access channel (PRACH) within a time-frequency resource space.

In some embodiments, the method may also include performing one or more retransmissions of the first message, wherein said transmission and said one or more retransmissions occur according to a pattern of times determined by configuration information transmitted by a first base station.

In some embodiments, the configuration information determines the pattern of times so that a first set of time-frequency resources usable by the UE device to perform said transmission and said one or more retransmissions is different from a second set of time-frequency resources usable by one or more other UE devices to transmit conventional random access preambles, wherein each of the conventional random access preambles includes at most two instances of a Zadoff-Chu sequence.

In some embodiments, the method may also include, when a handover of the UE from the first base station to a second base station is being performed, receiving a master information block (MIB) from the second base station prior to said transmitting the first message, wherein the MIB includes a system frame number associated with the second base station, wherein the system frame number is used to determine when a time has arrived for performing said transmitting the first message.

In some embodiments, the method may also include, when a handover of the UE from the first base station to a second base station is being performed, determining when a time has arrived for performing said transmission of the first message based on a system frame number received from the first base station, wherein the system frame number is synchronized between the first base station and the second base station.

In some embodiments, the method may also include, when a handover of the UE from the first base station to a second base station is being performed, receiving a radio resource control (RRC) information element transmitted by the first base station, wherein the RRC information element includes a system frame number associated with the second base station, wherein the system frame number is used to determine when a time has arrived for performing said transmitting the first message.

In some embodiments, the above-described actions of transmitting the first message and said one or more retransmissions are performed in response to stored information indicating that the UE is link budget limited.

In some embodiments, the action of transmitting the first message and said one or more retransmissions are performed in response to the UE determining that the UE is operating in a link-budget-limited condition.

In some embodiments, the method may also include, prior to said transmitting the first message, receiving the configuration information transmitted by the base station.

In some embodiments, the configuration information identifies the pattern of times from a predefined set of timing patterns, wherein each of the timing patterns.

In some embodiments, the first message includes a plurality of sub-carriers for conveying said at least three instances of the Zadoff-Chu sequence, wherein a spacing of the subcarriers is greater than 1.25 kHz.

In some embodiments, the first message spans more than one subframe.

In some embodiments, the method may also include receiving a second message transmitted by a base station, wherein the second message is transmitted by the base station in response to the base station successfully decoding the first message.

In some embodiments, the second message is transmitted by the base station two or more times and/or with lower coding rate.

In some embodiments, the second message is transmitted by the base station with a coding rate lower than conventional random access response messages.

In some embodiments, the method may also include transmitting a third message to the base station in response to successfully decoding the second message from the base station, wherein the third message is transmitted (a) with lower coding data rate than conventional PUSCH messages and/or (b) repeatedly in time.

In one set of embodiments, a method for operating a user equipment (UE) device may include transmitting a physical random access channel (PRACH) according to any one of the enhanced formats described herein, wherein said transmission of the PRACH according to said one of the enhanced format indicates to a base station (and/or to the network) that the UE device is link budget limited.

In some embodiments, the base station modifies its resource assignment in DL and grant in UL such that decoding of UL and DL messages are successful.

In some embodiments, the PRACH includes two or more segments spanning the same interval in time but occupying different intervals in frequency.

In one set of embodiments, a method for operating a base station may include the following operations.

The method may include transmitting first configuration information for one or more link-budget-limited user equipment (UE) devices, wherein each of the link-budget-limited UE devices is configured to transmit a random access preamble and perform one or more retransmissions of the random access preamble, wherein the random access preamble includes one or more instances of a Zadoff-Chu sequence, wherein the first configuration information indicates a pattern of times for said transmission and said one or more retransmissions of the random access preamble.

The method may also include receiving said transmission of the random access preamble from a first of the one or more UE devices to obtain a first data record, The method may also include receiving said one or more retransmissions of the random access preamble from the first UE device to obtain one or more additional data records.

The method may also include decoding the random access preamble based on the first data record and the one or more additional data records.

In some embodiments, the method may also include transmitting second configuration information for one or more UE devices that are not link budget limited, wherein each of the UE devices that are not link budget limited is configured to transmit a second random access preamble based on timing identified by the second configuration information, wherein the second random access preamble includes at most two instances of a Zadoff-Chu sequence.

In some embodiments, the first configuration information and the second configuration information are determined by the base station so that a first set of time-frequency resources usable by the first UE device to perform said transmission and said one or more retransmissions of the random access preamble is different from a second set of time-frequency resources usable by the one or more UE devices that are not link budget limited to transmit the second random access preambles.

In some embodiments, the method may also include, in response to decoding the random access preamble, transmitting a random access response to the first UE device, wherein the random access response is transmitted (a) with lower coding rate than conventional random access responses and/or (b) using a plurality of repetitions in time.

In some embodiments, the method may also include receiving a message from the first UE device, wherein the first UE device transmits the message after receiving the random access response, wherein the message is transmitted with coding rate lower than normal PUSCH messages and/or with a plurality of repetitions in time.

In some embodiments, the first configuration information identifies the pattern of times from a predetermined set of time patterns.

In some embodiments, the random access preamble includes at least three instances of the Zadoff-Chu sequence.

In some embodiments, the random access preamble includes a plurality of sub-carriers for conveying said at least three instances of the Zadoff-Chu sequence, wherein a spacing of the subcarriers is greater than 1.25 kHz.

In some embodiments, the random access preamble spans more than one sub frame.

In one set of embodiments, a method for operating a base station may include the following operations. The operations may be performed in order to facilitate random access by one or more link-budget-limited user equipment (UE) devices. Each of the link-budget-limited UE devices is configured to transmit a random access preamble and perform one or more retransmissions of the random access preamble, wherein the random access preamble includes one or more instances of a Zadoff-Chu sequence (e.g., a Zadoff-Chu sequence randomly selected by the link-budget-limited UE device). The base station and the one or more link-budget-limited UE devices may have previously agreed upon a pattern of times (and/or other configuration features such as frequency hopping pattern) for said transmission and said one or more retransmissions of the random access preamble. Thus, the pattern of times (and/or other configuration features) does not need to be signaled to the one or more link-budget-limited UE devices.

The operations may include receiving said transmission of the random access preamble from a first of the one or more UE devices to obtain a first data record.

The operations may also include receiving said one or more retransmissions of the random access preamble from the first UE device to obtain one or more additional data records.

The operations may also include decoding the random access preamble based on the first data record and the one or more additional data records.

II. Signaling by Sequence Set Selection, for Link Budget Limited UE Devices

In one set of embodiments, a method for operating a user equipment (UE) device to facilitate a random access procedure may include: selecting a set from a plurality of sets of Zadoff-Chu sequences based on a measurement of Doppler shift magnitude of UE relative to a base station, wherein identity of the selected set among the plurality of sets is usable by a base station to determine a correlation accumulation method; and performing two or more transmissions of a first message, wherein the first message includes one or more instances of a particular Zadoff-Chu sequence chosen from the selected set.

In some embodiments, the two or more transmissions are performed with frequency hopping over a plurality of time intervals, wherein different ones of the sets are associated with different patterns of frequency hopping.

In some embodiments, the two or more transmissions are performed according to one of a plurality of possible repetition patterns in time, wherein different ones of the sets are associated with different ones of the repetitions patterns in time.

In some embodiments, the correlation accumulation method is selected from a complex-valued accumulation method and an energy accumulation method.

In one set of embodiments, a method for operating a user equipment (UE) device to facilitate a random access procedure may include: selecting a set from a plurality of sets based on a measurement of Doppler shift magnitude of UE relative to a base station, wherein each of the sets includes a plurality of Zadoff-Chu sequences, wherein different ones of the sets have been assigned to different ranges of Doppler shift magnitude; and performing two or more transmissions of a first message, wherein the first message includes one or more instances of a particular Zadoff-Chu sequence chosen from the selected set.

In some embodiments, the base station is configured to: (a) receive symbol data in response to the two or more transmissions of the first message; (b) perform correlation processing on the symbol data to obtain information identifying the particular Zadoff-Chu sequence and information identifying the selected set among the plurality of sets; (c) select a correlation accumulation method from a complex-valued accumulation method and an energy accumulation method based on the information identifying the selected set; and (d) accumulate two or more correlation sequences according to the selected correlation accumulation method, wherein each of the two or more correlation sequences is generated by correlation of a respective portion of the symbol data with the particular Zadoff-Chu sequence, wherein each of the portions of the symbol data corresponds to a respective instance of the particular Zadoff-Chu sequence in one of the two or more transmissions.

In some embodiments, each of the two or more transmissions occurs in a different time interval, wherein a first of the transmissions in a first time interval occupies a first set of frequency resources, wherein a second of the transmissions in a second time interval occupies a second set of frequency resources different from the first set of frequency resources.

In some embodiments, the two or more transmissions respectively occupy two or more distinct time intervals, wherein frequency resources used to perform the two or more transmissions change from one the time intervals to the next according to a particular one of a plurality of frequency hopping patterns, wherein each of the plurality frequency hopping patterns is associated with a respective one of the plurality of sets.

In some embodiments, the base station is configured to: (a) receive symbol data in response to the two or more transmissions of the first message; (b) perform correlation processing on subsets of the symbol data, wherein each of the subsets of the symbol data corresponds to a respective one of the frequency hopping patterns, wherein the correlation processing determines information identifying the particular Zadoff-Chu sequence and information identifying the selected set among the plurality of sets of Zadoff-Chu sequences; (c) accumulate two or more correlation sequences generated by correlating two or more respective portions of a particular subset of the symbol data with the particular Zadoff-Chu sequence, wherein the particular subset of the symbol data is chosen based on the information identifying the selected set of Zadoff-Chu sequences, wherein each of the two or more portions of the particular subset corresponds to a respective instance of the particular Zadoff-Chu sequence in one of the two or more transmissions of the first message.

In some embodiments, the two or more transmissions are performed according to one of a plurality of repetition patterns in time, wherein each of the repetition patterns in time is associated with a respective one of the sets of Zadoff-Chu sequences.

In some embodiments, the base station is configured to: (a) receive symbol data in response to the two or more transmissions of the first message; (b) perform correlation processing on subsets of the symbol data, wherein each of the subsets corresponds to a respective one of the repetitions patterns in time, wherein the correlation processing determines information identifying the particular Zadoff-Chu sequence and information identifying the selected set among the plurality of sets of Zadoff-Chu sequences; and (c) accumulate two or more correlation sequences to obtain an accumulated correlation sequence, wherein the two or more correlation sequences are generated by correlating two or more respective portions of a particular subset of the symbol data with the particular Zadoff-Chu sequence, wherein the particular subset of the symbol data is chosen based on the information identifying the selected set of Zadoff-Chu sequences, wherein each of the two or more respective portions corresponds to a respective instance of the particular Zadoff-Chu sequence in one of the two or more transmissions of the first message.

In one set of embodiments, a method for operating a base station (to facilitate a random access procedure by a user equipment device) may include the following operations.

The method may include receiving symbol data in response to two or more transmissions of a first message from the UE device, wherein the UE device performs the two or more transmissions using a particular Zadoff-Chu sequence chosen from one of a plurality of sets of Zadoff-Chu sequences.

The method may also include performing correlation processing on the symbol data to identify said one set to which the particular Zadoff-Chu sequence belongs.

The method may also include accumulating correlation data records using an accumulation method, wherein the accumulation method is selected from a complex-valued accumulation method or an energy accumulation method based on the identity of said set.

In some embodiments, the UE device performs the two or more transmissions using frequency hopping over a plurality of time intervals, wherein different ones of the sets are associated with different patterns of frequency hopping. In these embodiments, the base station operating method may also include determining the frequency hopping pattern based on the identity of said set.

In some embodiments, the UE device performs the two or more transmissions according to one or a plurality of possible repetitions patterns in time, wherein different ones of the sets are associated with different repetition patterns in time. In these embodiments, the base station operating method may also include determining the repetition pattern based on the identity of said set.

In some embodiments, the correlation accumulation method is selected from a complex-valued accumulation method and an energy accumulation method.

In one set of embodiments, a method for operating a base station (to facilitate a random access procedure by a user equipment device) may include the following operations.

The method may include receiving symbol data in response to two or more transmissions of a first message from the UE device, wherein the first message includes one or more instances of a particular Zadoff-Chu sequence, wherein the particular Zadoff-Chu sequence has been chosen by the UE device from a selected one of a plurality of sets of Zadoff-Chu sequences, wherein each of the sets corresponds to a different range of magnitude of Doppler shift of the UE device relative to the base station.

The method may also include performing correlation processing on the symbol data to determine information identifying the particular Zadoff-Chu sequence and information identifying the selected set among the plurality of sets.

The method may also include selecting a correlation accumulation method from a complex-valued accumulation method and an energy accumulation method based on the information identifying the selected set.

The method may also include accumulating two or more correlation sequences according to the selected correlation accumulation method, wherein each of the two or more correlation sequences is generated by correlation of a respective portion of the symbol data with the particular Zadoff-Chu sequence, wherein each of the portions of the symbol data corresponds to a respective instance of the particular Zadoff-Chu sequence in one of the two or more transmissions.

In some embodiments, each of the two or more transmissions occurs in a different time interval, wherein a first of the transmissions in a first time interval occupies a first set of frequency resources, wherein a second of the transmissions in a second time interval occupies a second set of frequency resources different from the first set of frequency resources.

In some embodiments, the two or more transmissions respectively occupy two or more distinct time intervals, wherein frequency resources used to perform the two or more transmissions change from one the time intervals to the next according to a particular one of a plurality of frequency hopping patterns, wherein each of the plurality frequency hopping patterns is associated with a respective one of the plurality of sets.

In some embodiments, the base station operating method may also include: (a) receiving symbol data in response to the two or more transmissions of the first message; (b) performing correlation processing on subsets of the symbol data, wherein each of the subsets of the symbol data corresponds to a respective one of the frequency hopping patterns, wherein the correlation processing determines information identifying the particular Zadoff-Chu sequence and information identifying the selected set among the plurality of sets of Zadoff-Chu sequences; and (c) accumulating two or more correlation sequences generated by correlating two or more respective portions of a particular subset of the symbol data with the particular Zadoff-Chu sequence, wherein the particular subset of the symbol data is chosen based on the information identifying the selected set of Zadoff-Chu sequences, wherein each of the two or more portions of the particular subset corresponds to a respective instance of the particular Zadoff-Chu sequence in one of the two or more transmissions of the first message.

In some embodiments, the two or more transmissions are performed according to one of a plurality of repetition patterns in time, wherein each of the repetition patterns in time is associated with a respective one of the sets of Zadoff-Chu sequences.

In some embodiments, the base station operating method may also include: (a) receiving symbol data in response to the two or more transmissions of the first message; (b) performing correlation processing on subsets of the symbol data, wherein each of the subsets corresponds to a respective one of the repetitions patterns in time, wherein the correlation processing determines information identifying the particular Zadoff-Chu sequence and information identifying the selected set among the plurality of sets of Zadoff-Chu sequences; and (c) accumulating two or more correlation sequences to obtain an accumulated correlation sequence, wherein the two or more correlation sequences are generated by correlating two or more respective portions of a particular subset of the symbol data with the particular Zadoff-Chu sequence, wherein the particular subset of the symbol data is chosen based on the information identifying the selected set of Zadoff-Chu sequences, wherein each of the two or more respective portions corresponds to a respective instance of the particular Zadoff-Chu sequence in one of the two or more transmissions of the first message.

In some embodiments, the first message includes two instances of the particular Zadoff-Chu sequence.

III. Repeated PRACH Instances Transmitted Over Consecutive Subframes

In one set of embodiments, a method for operating a first user equipment device (to facilitate a random access procedure when the first UE device is link budget limited) may include transmitting a plurality of instances of a Physical Random Access Channel (PRACH) over a plurality of consecutive subframes to a base station, with each of the consecutive subframes including a corresponding one of the PRACH instances.

In some embodiments, resource blocks used by the first UE device to transmit a first of the PRACH instances in a first of the consecutive subframes are disjoint from resource blocks used by a second UE device to transmit a conventional PRACH subframe, wherein the second UE device is not link budget limited.

In some embodiments, resource blocks used by the first UE device to transmit a first of the PRACH instances in a first of the consecutive subframes at least partially overlap with resource blocks used by a second UE device to transmit a conventional PRACH subframe, wherein the second UE device is not link budget limited, wherein the first UE device and the second UE device are each configured to randomly select a corresponding ZC root for PRACH transmission. (Thus, the independently selected ZC roots are likely to be sufficiently orthogonal for unique identification at the base station.)

In some embodiments, the method also includes receiving system information (e.g., as part of SIB2) that indicates the number of said consecutive subframes.

In some embodiments, the number of said successive subframes is fixed, and known by the first UE device and the base station.

In some embodiments, wherein resource blocks used by the first UE device to transmit a PRACH instance hop in the frequency domain from one of the consecutive subframes to the next.

In some embodiments, a hopping pattern according to which the resource blocks hop in the frequency domain is fixed and known by the first UE device and the base station.

In some embodiments, the method may also include receiving system information (e.g., as part of SIB2) identifying a hopping pattern to be used to perform said hopping in the frequency domain.

In one set of embodiments, a method for operating a base station (to facilitate a random access procedure by a user equipment device) may include: receiving symbol data in response to a transmission of a plurality of instances of a PRACH by the UE device, wherein the plurality of PRACH instances are transmitted over a plurality of consecutive subframes, wherein each of the plurality of consecutive subframes contains a corresponding one of the PRACH instances; and performing correlation processing on the symbol data to determine which Zadoff-Chu (ZC) sequence from a set of available ZC sequences is included in the plurality of PRACH instances, wherein said correlation processing accumulates correlation data over the plurality of consecutive subframes.

In some embodiments, resource blocks used by the first UE device to transmit a first of the PRACH instances in a first of the consecutive subframes are disjoint from resource blocks used by a second UE device to transmit a conventional PRACH subframe, wherein the second UE device is not link budget limited.

In some embodiments, resource blocks used by the first UE device to transmit a first of the PRACH instances in a first of the consecutive subframes at least partially overlap with resource blocks used by a second UE device to transmit a conventional PRACH subframe, wherein the second UE device is not link budget limited, wherein the first UE device and the second UE device are each configured to randomly select a corresponding ZC root for PRACH transmission.

IV. Transmission of PRACH Instances after Conventional PRACH Preamble

In one set of embodiments, a method for operating a first user equipment (UE) device (to facilitate a random access procedure) may include the following operations.

If the first UE device is link budget limited, the first UE device may perform operations including: transmitting a first set of one or more instances of a Physical Random Access Channel (PRACH) respectively over a first set of one or more consecutive subframes, wherein said transmitting the first set of one or more PRACH instances is performed according to a conventional format for transmission of PRACH; and transmitting a second set of one or more instances of the PRACH respectively over a second set of one or more consecutive subframes starting immediately after a last subframe of the first set of one or more subframes, wherein each of the one or more PRACH instances of the first set and each of the one or more PRACH instances of the second set use the same Zadoff-Chu sequence.

In some embodiments, the method may also include, prior to said transmitting the first set of one or more PRACH instances, receiving system information (e.g., in SIB2) from a base station, wherein the system information indicates at least the conventional format. (The "conventional format" may, e.g., be a format specified by 3GPP TS 36.211.)

In some embodiments, the conventional format is a fixed format known to a base station serving the UE device.

In some embodiments, the conventional format corresponds to PRACH format 0 of 3GPP TS 36.211, wherein the first set of one or more subframes includes only one subframe.

In some embodiments, the conventional format corresponds to PRACH format 2 of 3GPP TS 36.211, wherein the first set of one or more subframes includes exactly two subframes.

In some embodiments, a PRACH configuration (e.g., number of PRACH-containing resource blocks, number of ZC sequence repetitions, ZC sequence length) for each subframe of the first set and for each subframe of the second set is identical.

In one set of embodiments, a method for operating a first user equipment device (to facilitate a random access procedure) may include the following actions. If the first UE device is link budget limited, the first UE device may perform operations including: transmitting a first set of one or more consecutive subframes including a first Physical Random Access Channel (PRACH), wherein the first PRACH is transmitted according to a conventional format for PRACH transmission; and transmitting a second set of one or more consecutive subframes containing one or more repetitions of the first PRACH, wherein the second set of one or more subframes starts immediately after a last subframe of the first set of one or more subframes, wherein each of the one or more PRACH repetitions uses the same Zadoff-Chu sequence as the first PRACH.

In one set of embodiments, a method for operating a base station (to facilitate a random access procedure by a user equipment device) may include the following operations.

The method may include receiving a first symbol data set in response to a first transmission by the UE device, wherein the first transmission includes a first set of one or more instances of a Physical Random Access Channel (PRACH) respectively over a first set of one or more consecutive subframes, wherein said first transmission is performed according to a conventional format for transmission of PRACH.

The method may also include receiving a second symbol data set in response to a subsequent transmission by the UE device, wherein the subsequent transmission includes a second set of one or more consecutive subframes starting immediately after a last subframe of the first set of one or more subframes.

The method may also include performing correlation processing on a union of the first symbol data set and the second symbol data set to determine if the second set of one or more consecutive subframes contains one or more PRACH instances in addition to the first set of one or more PRACH instances, wherein the one or more additional PRACH instances, if present, are assumed to use to the same ZC sequence as the one or more PRACH instances of the first set.

The method may also include, in response to determining that the second set of one or more consecutive subframes contains one or more PRACH instances in addition to the first set of one or more PRACH instances, storing in memory an indication that the UE device is link budget limited.

In some embodiments, the method may also include, prior to the above-described action of receiving the first symbol data set, transmitting system information that indicates at least the conventional format.

In some embodiments, the conventional format is a fixed format known to the base station.

In some embodiments, the method also includes, in response to the indication that the UE device is link budget limited, transmitting one or more messages of a random access procedure to the UE device using a lower coding rate (or increased redundancy) than used for non-link-budget limited UE devices.

In some embodiments, the method also includes, in response to the indication that the UE device is link budget limited, transmitting downlink payload data to the UE device using a lower coding rate (or increased redundancy) than used for non-link-budget limited UE devices.

In one set of embodiments, a method for operating a base station (to facilitate a random access procedure by a user equipment device) may include the following operations.

The method may include receiving a first symbol data set in response to a first transmission by the UE device, wherein the first transmission is a transmission of a first set of one or more consecutive subframes including a first Physical Random Access Channel (PRACH), wherein said first PRACH is transmitted according to a conventional format for PRACH transmission.

The method may also include receiving a second symbol data set in response to a subsequent transmission by the UE device, wherein the subsequent transmission is a transmission of a second set of one or more consecutive subframes, wherein the second set of one or more consecutive subframes starts immediately after a last subframe of the first set of one or more subframes.

The method may also include performing correlation processing on a union of the first symbol data set and the second symbol data set to determine if the second set of one or more consecutive subframes contains one or more repetitions of the first PRACH, wherein the one or more repetitions of the first PRACH, if present, are assumed to use to the same Zadoff-Chu sequence as the first PRACH.

The method may also include, in response to determining that the second set of one or more consecutive subframes contains one or more repetitions of the first PRACH, storing in memory an indication that the UE device is link budget limited.

V. Reserved Logical Root Sequence Numbers for the Link-Budget-Limited Devices

In one set of embodiments, a method for operating a first user equipment device (to facilitate a random access procedure) may include the following actions.

The method may include receiving system information including a configuration index for Physical Random Access Channel (PRACH), a cyclic shift value (Ncs) and a logical root number.

If the first UE device is link budget limited, the method may also include performing operations including: (a) computing a first physical root number based on the logical root number, wherein the first physical root number is different from a conventional physical root number corresponding to the logical root number; (b) generating a first set of Zadoff-Chu sequences based on the cyclic shift value and one or more physical root numbers including the first physical root number; (c) randomly selecting one of the Zadoff-Chu sequences of the first set; and (d) transmitting a first PRACH subframe that includes repetitions of the selected Zadoff-Chu sequence, wherein the first PRACH subframe is transmitted during a first radio frame.

In some embodiments, the first physical root number is a member of a reserved set of physical root numbers that has been reserved for use only by UE devices that are link budget limited.

In some embodiments, the first physical root number is determined based on a predefined mapping of logical root number to physical root number, wherein the mapping is agreed between UE device and a base station.

In some embodiments, the first physical root number is computed from the logical root number using a fixed formula that is known by base stations of a wireless network to which the UE device is subscribed.

In some embodiments, the number of Zadoff-Chu sequences in said first set is: less than or equal to 32; or less than or equal to 24; or less than or equal to 16; or in the range [9,16]; or in the range [10,14].

In some embodiments, the above-described operations may also include selecting the first radio frame so that its radio frame number is a multiple of a fixed integer greater than one, wherein the first integer is known to base stations of a wireless network to which to the first UE device is subscribed.

In some embodiments, the operations also include transmitting one or more additional PRACH subframes, wherein each of the one or more additional PRACH subframes includes repetitions of the selected Zadoff-Chu sequence, wherein each of the one or more additional PRACH subframes occupies a conventionally-allowed subframe of the first radio frame or a conventionally-allowed subframe of a second radio frame immediately following the first radio frame, wherein the conventionally-allowed subframes are subframes conventionally allowed based on the PRACH configuration index as defined in TS 36.211.

In some embodiments, the first set of Zadoff-Chu sequences is disjoint from the conventional set of 64 Zadoff-Chu sequences as defined by TS 36.211 based on the logical sequence number and the cyclic shift value.

In one set of embodiments, a method for operating a base station (to facilitate a random access procedure by a user equipment device) may include the following operations.

The method may include transmitting system information including a configuration index for Physical Random Access Channel (PRACH), a cyclic shift value (Ncs) and a logical root number.

The method may also include receiving symbol data over two or more subframes that are consistent with the PRACH configuration index.

The method may also include performing a correlation search process to determine whether the symbol data includes repetitions of any Zadoff-Chu sequence from a first set of Zadoff-Chu sequences, wherein the first set of Zadoff-Chu sequences is determined based on the cyclic shift value and one or more physical root numbers including a first physical root number, wherein the first physical root number is different from a conventional physical root number corresponding to the logical root number.

The method may also include, in response to said correlation search process determining that the symbol data includes repetitions of a particular Zadoff-Chu sequence of the first set, storing in memory an indication that the UE device is link budget limited.

In some embodiments, the two or more subframes occur in one or more consecutive radio frames.

In some embodiments, the first physical root number is a member of a reserved set of physical root numbers that has been reserved for use only by UE devices that are link budget limited.

In some embodiments, the first physical root number is determined based on a predefined mapping of logical root number to physical root number, wherein the mapping is agreed between UE device and the base station.

In some embodiments, the number of Zadoff-Chu sequences in said first set is: less than or equal to 32; or less than or equal to 24; or less than or equal to 16; or in the range [9,16]; or in the range [10,14].

In some embodiments, wherein the above-described action of receiving symbol data starts in first radio frame whose frame number is a multiple of a fixed integer greater than one, wherein UE devices that are link budget limited are configured to start transmitting PRACH information only in radio frames whose frame number is a multiple of the fixed integer.

In some embodiments, the first set of Zadoff-Chu sequences is disjoint from the conventional set of 64 Zadoff-Chu sequences as defined by TS 36.211 based on the logical sequence number and the cyclic shift value.

In some embodiments, the method may also include, in response to the indication that the UE device is link budget limited, transmitting one or more messages of a random access procedure to the UE device using a lower coding rate (or increased redundancy) than used for non-link-budget limited UE devices.

In some embodiments, the method may also include, in response to the indication that the UE device is link budget limited, transmitting downlink payload data to the UE device using a lower coding rate (or increased redundancy) than used for non-link-budget-limited UE devices.

Embodiments of the present invention may be realized in any of various forms. For example, in some embodiments, the present invention may be realized as a computer-implemented method, a non-transitory computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE or a base station) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

In some embodiments, an integrated circuit may be configured to perform any of the various method embodiments described herein (or, any combination of the method embodiments described herein, or, any subset of any of the method embodiments described herein, or, any combination of such subsets). The integrated circuit may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for operating a base station, the method comprising:
perform operations in order to facilitate random access by one or more link-budget-limited user equipment (UE) devices, wherein each of the link-budget-limited UE devices is configured to transmit a random access preamble and perform one or more retransmissions of the random access preamble, wherein the random access preamble includes one or more instances of a Zadoff-Chu sequence, wherein the operations include:
receiving said transmission of the random access preamble from a first of the one or more UE devices to obtain a first data record;
receiving said one or more retransmissions of the random access preamble from the first UE device to obtain one or more additional data records;
decoding the random access preamble based on the first data record and the one or more additional data records.

2. The method of claim 1, further comprising:
transmitting first configuration information for the one or more link-budget-limited user equipment (UE) devices, wherein the first configuration information indicates a pattern of times for said transmission and said one or more retransmissions of the random access preamble; and/or
transmitting second configuration information for one or more UE devices that are not link budget limited, wherein each of the UE devices that are not link budget limited is configured to transmit a second random access preamble based on timing identified by the second configuration information, wherein the second random access preamble includes at most two instances of a Zadoff-Chu sequence.

3. The method of claim 1, further comprising:
in response to decoding the random access preamble, transmitting a random access response to the first UE device, wherein the random access response is transmitted (a) with lower coding rate than conventional random access responses and/or (b) using a plurality of repetitions in time.

4. A method for operating a first user equipment (UE) device to facilitate a random access procedure when the first UE device is link budget limited, the method comprising:
transmitting a plurality of instances of a Physical Random Access Channel (PRACH) over a plurality of consecutive subframes to a base station, with each of the consecutive subframes including a corresponding one of the PRACH instances;
wherein resource blocks used by the first UE device to transmit a first of the PRACH instances in a first of the consecutive subframes at least partially overlap with resource blocks used by a second UE device to transmit a conventional PRACH subframe, wherein the second UE device is not link budget limited, wherein the first UE device and the second UE device are each configured to randomly select a corresponding Zadoff-Chu (ZC) root for PRACH transmission.

5. The method of claim 4, wherein resource blocks used by the first UE device to transmit a PRACH instance hop in a frequency domain from one of the consecutive subframes to the next.

6. A method for operating a base station to facilitate a random access procedure by a user equipment (UE) device, the method comprising:
receiving symbol data in response to a transmission of a plurality of instances of a PRACH by the UE device, wherein the plurality of PRACH instances are transmitted over a plurality of consecutive subframes, wherein each of the plurality of consecutive subframes contains a corresponding one of the PRACH instances;
performing correlation processing on the symbol data to determine which Zadoff-Chu (ZC) sequence from a set of available ZC sequences is included in the plurality of PRACH instances, wherein said correlation processing accumulates correlation data over the plurality of consecutive subframes.

7. The method of claim 6, wherein resource blocks used by the UE device to transmit a first of the PRACH instances in a first of the consecutive subframes are disjoint from resource blocks used by a second UE device to transmit a conventional PRACH subframe, wherein the second UE device is not link budget limited.

8. The method of claim 6, wherein resource blocks used by the UE device to transmit a first of the PRACH instances in a first of the consecutive subframes at least partially overlap with resource blocks used by a second UE device to transmit a conventional PRACH subframe, wherein the second UE device is not link budget limited, wherein the first UE device and the second UE device are each configured to randomly select a corresponding ZC root for PRACH transmission.

9. A method for operating a first user equipment (UE) device to facilitate a random access procedure, the method comprising:
when the first UE device is link budget limited, performing operations including:
transmitting a first set of one or more instances of a Physical Random Access Channel (PRACH) respectively over a first set of one or more consecutive subframes, wherein said transmitting the first set of one or more PRACH instances is performed according to a conventional format for transmission of PRACH;
transmitting a second set of one or more instances of the PRACH respectively over a second set of one or more consecutive subframes starting immediately after a last subframe of the first set of one or more subframes, wherein each of the one or more PRACH instances of the first set and each of the one or more PRACH instances of the second set use the same Zadoff-Chu sequence.

10. The method of claim 9, further comprising:
prior to said transmitting the first set of one or more PRACH instances, receiving system information from a base station, wherein the system information indicates at least the conventional format.

11. The method of claim 9, wherein a PRACH configuration for each subframe of the first set and for each subframe of the second set is identical.

12. A method for operating a base station to facilitate a random access procedure by a user equipment (UE) device, the method comprising:
receiving a first symbol data set in response to a first transmission by the UE device, wherein the first transmission includes a first set of one or more instances of a Physical Random Access Channel (PRACH) respectively over a first set of one or more consecutive subframes, wherein said first transmission is performed according to a conventional format for transmission of PRACH;
receiving a second symbol data set in response to a subsequent transmission by the UE device, wherein the subsequent transmission includes a second set of one or more consecutive subframes starting immediately after a last subframe of the first set of one or more subframes;
performing correlation processing on a union of the first symbol data set and the second symbol data set to determine if the second set of one or more consecutive subframes contains one or more PRACH instances in addition to the first set of one or more PRACH instances, wherein the one or more additional PRACH instances, if present, are assumed to use to the same ZC sequence as the one or more PRACH instances of the first set; and
in response to determining that the second set of one or more consecutive subframes contains one or more PRACH instances in addition to the first set of one or more PRACH instances, storing in memory an indication that the UE device is link budget limited.

13. The method of claim 12, further comprising:
prior to said receiving the first symbol data set, transmitting system information that indicates at least the conventional format.

14. The method of claim 12, wherein the conventional format is a fixed format known to the base station.

15. The method of claim 12, further comprising:
in response to the indication that the UE device is link budget limited, transmitting one or more messages of a random access procedure to the UE device using a lower coding rate than used for non-link-budget limited UE devices.

16. The method of claim 12, further comprising:
in response to the indication that the UE device is link budget limited, transmitting downlink payload data to the UE device using a lower coding rate than used for non-link-budget limited UE devices.

17. A method for operating a first user equipment (UE) device to facilitate a random access procedure, the method comprising:
receiving system information including a configuration index for Physical Random Access Channel (PRACH), a cyclic shift value (Ncs) and a logical root number;
when the first UE device is link budget limited, performing operations including:
computing a first physical root number based on the logical root number, wherein the first physical root number is different from a conventional physical root number corresponding to the logical root number;
generating a first set of Zadoff-Chu sequences based on the cyclic shift value and one or more physical root numbers including the first physical root number;
randomly selecting one of the Zadoff-Chu sequences of the first set;
transmitting a first PRACH subframe that includes repetitions of the selected Zadoff-Chu sequence, wherein the first PRACH subframe is transmitted during a first radio frame.

18. The method of claim 17, wherein the first physical root number is a member of a reserved set of physical root numbers that has been reserved for use only by UE devices that are link budget limited.

19. The method of claim 17, wherein the first physical root number is determined based on a predefined mapping of logical root number to physical root number, wherein the mapping is agreed between UE device and a base station.

20. The method of claim 17, wherein the first physical root number is computed from the logical root number using a fixed formula that is known by base stations of a wireless network to which the UE device is subscribed.

21. A method for operating a base station to facilitate a random access procedure by a user equipment (UE) device, the method comprising:
transmitting system information including a configuration index for Physical Random Access Channel (PRACH), a cyclic shift value (Ncs) and a logical root number;
receiving symbol data over two or more subframes that are consistent with the PRACH configuration index;
performing a correlation search process to determine whether the symbol data includes repetitions of any Zadoff-Chu sequence from a first set of Zadoff-Chu sequences, wherein the first set of Zadoff-Chu sequences is determined based on the cyclic shift value and one or more physical root numbers including a first physical root number, wherein the first physical root number is different from a conventional physical root number corresponding to the logical root number;
in response to said correlation search process determining that the symbol data includes repetitions of a particular Zadoff-Chu sequence of the first set, storing in memory an indication that the UE device is link budget limited.

22. The method of claim 21, wherein the two or more subframes occur in one or more consecutive radio frames.

23. The method of claim 21, wherein said receiving symbol data starts in first radio frame whose frame number is a multiple of a fixed integer greater than one, wherein UE devices that are link budget limited are configured to start transmitting PRACH information only in radio frames whose frame number is a multiple of the fixed integer.

24. The method of claim 21, wherein the first set of Zadoff-Chu sequences is disjoint from the conventional set of Zadoff-Chu sequences as defined by TS 36.211 based on the logical sequence number and the cyclic shift value.

25. An apparatus configured for inclusion in a link budget limited user equipment (UE) device, comprising:
one or more processing elements, wherein the one or more processing elements are configured to:
transmit a first set of one or more instances of a Physical Random Access Channel (PRACH) respectively over a first set of one or more consecutive subframes, wherein said transmitting the first set of one or more PRACH instances is performed according to a conventional format for transmission of PRACH; and
transmit a second set of one or more instances of the PRACH respectively over a second set of one or more consecutive subframes starting immediately after a last subframe of the first set of one or more subframes, wherein each of the one or more PRACH instances of the first set and each of the one or more PRACH instances of the second set use the same Zadoff-Chu sequence.

26. The apparatus of claim 25, wherein the one or more processing elements are further configured to:
prior to said transmitting the first set of one or more PRACH instances, receive system information from a base station, wherein the system information indicates at least the conventional format.

27. The apparatus of claim 25, wherein a PRACH configuration for each subframe of the first set and for each subframe of the second set is identical.

* * * * *